(12) United States Patent
Celikkaya et al.

(10) Patent No.: US 7,811,496 B2
(45) Date of Patent: Oct. 12, 2010

(54) METHODS OF MAKING CERAMIC PARTICLES

(75) Inventors: Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1633 days.

(21) Appl. No.: 10/358,772

(22) Filed: Feb. 5, 2003

(65) Prior Publication Data

US 2004/0148967 A1 Aug. 5, 2004

(51) Int. Cl.
*B29C 39/02* (2006.01)

(52) U.S. Cl. ................................ 264/232; 264/233

(58) Field of Classification Search ................ 264/234, 264/332, 164, 165; 65/21.2, 21.1, 33.9, 66, 65/122, 143
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Löffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |

(Continued)

FOREIGN PATENT DOCUMENTS

AT 333146 11/1976

(Continued)

OTHER PUBLICATIONS

Aasland and McMillan, Nature 369, 633 (1994).

(Continued)

*Primary Examiner*—Carlos Lopez

(57) ABSTRACT

Method for making ceramic particles. Embodiments of ceramic particles made according to the present invention can be are particularly useful as abrasive particles.

73 Claims, 8 Drawing Sheets

U.S. PATENT DOCUMENTS

| | | |
|---|---|---|
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Monroe et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |

| | | | | | | |
|---|---|---|---|---|---|---|
| 5,520,711 | A | 5/1996 | Helmin | 6,589,305 B1 | 7/2003 | Rosenflanz |
| 5,534,843 | A | 7/1996 | Tsunoda et al. | 6,592,640 B1 | 7/2003 | Rosenflanz |
| 5,547,479 | A | 8/1996 | Conwell et al. | 6,596,041 B2 | 7/2003 | Rosenflanz |
| 5,549,962 | A | 8/1996 | Holmes et al. | 6,607,570 B1 | 8/2003 | Rosenflanz et al. |
| 5,551,963 | A | 9/1996 | Larmie | 6,620,214 B2 | 9/2003 | McArdle et al. |
| 5,552,213 | A | 9/1996 | Eschner | 6,666,750 B1 | 12/2003 | Rosenflanz |
| 5,569,547 | A | 10/1996 | Waku et al. | 6,749,653 B2 | 6/2004 | Castro et al. |
| 5,593,467 | A | 1/1997 | Monroe | 2001/0030811 A1 | 10/2001 | Kasai et al. |
| 5,605,870 | A | 2/1997 | Strom-Olsen et al. | 2002/0066233 A1 | 6/2002 | McArdle et al. |
| 5,609,706 | A | 3/1997 | Benedict et al. | 2002/0160694 A1 | 10/2002 | Wood et al. |
| 5,611,829 | A | 3/1997 | Monroe et al. | 2003/0040423 A1 | 2/2003 | Harada et al. |
| 5,628,952 | A * | 5/1997 | Holmes et al. ......... 264/331.11 | 2003/0110706 A1 | 6/2003 | Rosenflanz |
| 5,641,469 | A | 6/1997 | Garg et al. | 2003/0145525 A1* | 8/2003 | Rosenflanz ................. 51/307 |
| 5,645,619 | A | 7/1997 | Erickson et al. | 2004/0148868 A1 | 8/2004 | Anderson et al. |
| 5,651,925 | A | 7/1997 | Ashley et al. | 2005/0075233 A1 | 4/2005 | Weber et al. |
| 5,653,775 | A | 8/1997 | Plovnick et al. | | | |
| 5,665,127 | A | 9/1997 | Moltgen et al. | FOREIGN PATENT DOCUMENTS | | |
| 5,679,067 | A | 10/1997 | Johnson et al. | DE | 20 34 011 | 7/1970 |
| 5,682,082 | A | 10/1997 | Wei et al. | DE | 134 638 A | 3/1979 |
| 5,693,239 | A | 12/1997 | Wang et al. | DE | 141 420 | 4/1980 |
| 5,721,188 | A | 2/1998 | Sung et al. | DE | 141420 A | 4/1980 |
| 5,725,162 | A | 3/1998 | Garg et al. | EP | 0 200 487 | 11/1986 |
| 5,733,178 | A | 3/1998 | Obishi | EP | 0 227 374 | 7/1987 |
| 5,733,564 | A | 3/1998 | Lehtinen | EP | 0 236 507 | 9/1987 |
| 5,738,696 | A | 4/1998 | Wu | EP | 0 291 029 A1 | 11/1988 |
| 5,747,397 | A | 5/1998 | McPherson et al. | EP | 0 408 771 A1 | 1/1991 |
| 5,763,345 | A | 6/1998 | Ohshima et al. | EP | 0 469 271 | 2/1992 |
| 5,782,940 | A | 7/1998 | Jayan et al. | EP | 0 480 678 A1 | 4/1992 |
| 5,804,513 | A | 9/1998 | Sakatani et al. | EP | 0 494 638 | 7/1992 |
| 5,847,865 | A | 12/1998 | Gopinath et al. | EP | 0 495 536 A2 | 7/1992 |
| 5,856,254 | A | 1/1999 | Feige et al. | EP | 0 579 281 A1 | 1/1994 |
| 5,863,308 | A | 1/1999 | Qi et al. | EP | 0 601 453 A2 | 6/1994 |
| 5,876,470 | A | 3/1999 | Abrahamson | EP | 0 647 601 A1 | 4/1995 |
| 5,902,763 | A | 5/1999 | Waku et al. | EP | 0 666 238 B1 | 8/1995 |
| 5,903,951 | A | 5/1999 | Ionta et al. | EP | 0 666 239 B1 | 8/1995 |
| 5,952,256 | A | 9/1999 | Morishita et al. | EP | 0 709 347 | 5/1996 |
| 5,954,844 | A | 9/1999 | Law et al. | EP | 0 722 919 A1 | 7/1996 |
| 5,961,674 | A | 10/1999 | Gagliardi et al. | EP | 0 291 029 B2 | 11/1996 |
| 5,975,988 | A | 11/1999 | Christianson | FR | 1547989 | 10/1968 |
| 5,976,274 | A | 11/1999 | Inoue et al. | FR | 2 118 026 | 7/1972 |
| 5,981,413 | A | 11/1999 | Hale | FR | 2 538 370 | 6/1984 |
| 5,981,415 | A | 11/1999 | Waku et al. | FR | 2 609 708 | 7/1988 |
| 6,053,956 | A | 4/2000 | Wood | GB | 793503 | 4/1958 |
| 6,054,093 | A | 4/2000 | Torre, Jr. et al. | GB | 1005338 | 9/1965 |
| 6,123,743 | A | 9/2000 | Carman et al. | GB | 1 121 875 | 7/1968 |
| 6,128,430 | A | 10/2000 | Chu et al. | GB | 1 260 933 A | 1/1972 |
| 6,146,244 | A | 11/2000 | Atsugi et al. | GB | 2 116 992 | 10/1983 |
| 6,214,429 | B1 | 4/2001 | Zou et al. | GB | 2 377 438 A | 1/2003 |
| 6,245,700 | B1 | 6/2001 | Budd et al. | JP | 50-25608 | 3/1975 |
| 6,251,813 | B1 | 6/2001 | Sato | JP | 59 22 7726 A | 12/1984 |
| 6,254,981 | B1 | 7/2001 | Castle | JP | 60-221338 | 11/1985 |
| 6,268,303 | B1 | 7/2001 | Aitken et al. | JP | 61099665 | 5/1986 |
| 6,277,161 | B1 | 8/2001 | Castro et al. | JP | 62-003041 | 1/1987 |
| 6,287,353 | B1 | 9/2001 | Celikkaya | JP | 63-156024 | 6/1988 |
| 6,306,926 | B1 | 10/2001 | Bretscher et al. | JP | 63-303821 | 12/1988 |
| 6,335,083 | B1 | 1/2002 | Kasai et al. | JP | HEI 4-119941 | 4/1992 |
| 6,361,414 | B1 | 3/2002 | Ravkin et al. | JP | 05-085821 | 4/1993 |
| 6,362,119 | B1 | 3/2002 | Chiba | JP | 05-226733 | 9/1993 |
| 6,447,937 | B1 | 9/2002 | Murakawa et al. | JP | 06 040765 A | 2/1994 |
| 6,451,077 | B1 | 9/2002 | Rosenflanz | JP | 06-171974 | 6/1994 |
| 6,454,822 | B1 | 9/2002 | Rosenflanz | JP | 3113428 A | 5/1999 |
| 6,458,731 | B1 | 10/2002 | Rosenflanz | JP | HEI 11-189926 | 7/1999 |
| 6,461,988 | B2 | 10/2002 | Budd et al. | JP | 10-208229 | 2/2000 |
| 6,469,825 | B1 | 10/2002 | Digonnet et al. | JP | 10-208244 | 2/2000 |
| 6,482,758 | B1 | 11/2002 | Weber et al. | JP | 200045128 A | 2/2000 |
| 6,482,761 | B1 | 11/2002 | Watanabe et al. | JP | 200045129 A | 2/2000 |
| 6,484,539 | B1 | 11/2002 | Nordine et al. | JP | 201294480 | 10/2001 |
| 6,490,081 | B1 | 12/2002 | Feillens et al. | JP | 2003-94414 | 4/2003 |
| 6,511,739 | B2 | 1/2003 | Kasai et al. | KR | 9601009 B1 | 1/1996 |
| 6,514,892 | B1 | 2/2003 | Kasai et al. | SU | 1455569 | 10/1996 |
| 6,521,004 | B1 | 2/2003 | Culler et al. | WO | WO 94/14722 | 7/1994 |
| 6,582,488 | B1 | 6/2003 | Rosenflanz | WO | WO 97/16385 | 5/1997 |
| 6,583,080 | B1 | 6/2003 | Rosenflanz | | | |

| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |
| WO | WO 03/011776 A1 | 2/2003 |

OTHER PUBLICATIONS

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

Gonzalez, Eduardo J., et al., "High Pressure Compaction and Sintering of Nano-Size γ-$Al_2O_3$ Powder", *Materials and Manufacturing Processes* vol. 11, No. 6, 951-967, 1996.

Jantzen, C.M., Krepski, R.P., & Herman, H., "Ultra-Rapid Quenching of Laser-Method Binary and Unary Oxides", *Mat. Res. Bull*. 15, 1313-1326 (1980).

Khor K.A., "Novel ZrO2-Mullite Composites Produced by Plasma Spraying", Proceedings of the 15$^{th}$ International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of SiO2-Al2O3 Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polyamorphic Transitions in Yttria-Alumina Liquids", *J. Non-Cryst. Solids*. 293-295, 357-365 (2001).

U.S. Application entitled "Methods of Making $Al_2O_3$-$SiO_2$ Ceramics," Celikkaya et al., filed Sep. 5, 2003, having U.S. Appl. No. 10/655,729.

U.S. Application entitled "Methods of Making Ceramics Comprising $AL_2O_3$, REO, $ZRO_2$ and/or $HfO_2$ and $Nb_2O_5$ and/or $Ta_2O_5$," Rosenflanz, filed Sep. 18, 2003, having U.S. Appl. No. 10/666,615.

U.S. Application entitled "Ceramics Comprising $AL_2O_3$, REO, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,212.

U.S. Application entitled "Ceramics Comprising $AL_2O_3$, $Y_2O_3$, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,098.

U.S. Application entitled "Alumina-Yttria Particles and Methods of Making the Same," Anderson et al., filed Dec. 18, 2003, having U.S. Appl. No. 10/740,262.

U.S. Application entitled "Method of Making Abrasive Particles," Anderson et al., filed Dec. 18, 2003, having U.S. Appl. No. 10/739,420.

U.S. Application entitled "Transparent Fused Crystalline Ceramic, and Method of Making the Same," Rosenflanz et al., filed Dec. 18, 2003, having U.S. Appl. No. 10/739,439.

U.S. Application entitled "Method of Making Abrasive Particles," Anderson et al., filed Dec. 18, 2003, having U.S. Appl. No. 10/739,440.

U.S. Application entitled "Method of Making Abrasive Particles," Celikkaya et al., filed Dec. 18, 2003, having U.S. Appl. No. 10/740,096.

U.S. Application entitled "Method of Making Abrasive Particles," Celikkaya et al., filed Dec. 18, 2003, having U.S. Appl. No. 10/739,441.

U.S. Application entitled "Powder Feeding Method and Apparatus," Celikkaya et al., filed Dec. 18, 2003, having U.S. Appl. No. 10/739,233.

U.S. Application entitled "Use of Ceramics in Dental and Orthodontic Applications," Cummings et al., filed Feb. 5, 2003, having U.S. Appl. No. 10/358,856.

U.S. Application entitled "Use of Glasses Containing Rare Earth Oxide, Alumina, and Zirconia and Dopant in Optical Waveguides," Cummings et al., filed Apr. 28, 2003, having U.S. Appl. No. 10/425,039.

U.S. Application entitled "Ceramic Aggregate Particles," McArdle et al., filed Feb. 11, 2004, having U.S. Appl. No. 10/776,156.

Article: Imakoa, Minoru et al., "Refractive Index and Abbe's Number of Glass of Lanthanum Borate System," *Journal Ceramic Assoc. Japan*, vol. 70, No. 5, (1962), pp. 115 et seq.

Book Excerpt: Kingery, W.D., *Introduction to Ceramics*, Second Edition, Chpt. III subchapter 8.8, Glass-Ceramic Materials, (1976), pp. 368-374.

Article: Kokubo, Tadashi et al., "Infrared Transmission of ($R_2O$ or R'O)-($TiO_2$, $Nb_2O_5$ or $Ta_2O_5$)-$Al_2O_3$ Glasses," *Journal of Non-Crystalline Solids 22*, (1970), pp. 125-134.

Book: McMillan, P.W., *Glass-Ceramics*, Academic Press, Inc., 2$^{nd}$ Edition (1979). (Too Voluminous).

Symposium: Stookey, "Ceramics Made by Nucleation of Glass—Comparison of Microstructure and Properties with Sintered Ceramics," (1962), pp. 1-4.

Book Excerpt: Varshneya, *Fundamentals of Inorganic Glasses*, (1994), pp. 425-427.

Kondrashov V I et al., "Opacified Glass "Decorit" Synthesis Directions", Steklo I Keramika 2001, No. 1, pp. 8-11.

"$Gd_3Al_5O_{12}$ Phase Obtained by Crystallization of Amorphous $Gd_2O_3$ ⅗$Al_2O_3$," Shishido et al., *Journal of the American Ceramic Society*, vol. 61, No. 7-8, Jul.-Aug. 1978, pp. 373-374.

"Rapid Quenching on the Binary Systems of High Temperature Oxides," Suzuki et al., *Mat. Res. Bull*., vol. 9, 1974, pp. 745-754.

"Unusual Glass Formation in the A1-Nd-O System," Yajima et al., Chemistry Letters (published by the Chemical Society of Japan), 1973, pp. 741-742.

Glass Formation in the Ln-Al-O System, (Ln: Lanthanoid and Yttrium Elements), Yajima et al., Chemistry Letters, 1973, pp. 1327-1330.

"Production and Studies of Alumina Based Refractory Glass," Coutures et al., *Mat. Res. Bull*., vol. 10, No. 6, 1975, pp. 539-546.

"Net Optical Gain at 1.53 μm in Er-Doped $Al_2O_3$ Waveguides on Silicon," van den Hoven et al., Appl. Phys. Lett. 68 (14), Apr. 1, 1966, pp. 1886-1888.

"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Device Materials Based on Er-, Ho-, Tm-, and Yb-Doped Rare Earth Aluminum Oxide (REA1™) Glass, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

"Durable 3—5 μm Transmitting Infrared Window Materials," Harris et al., Infrared Physics & Technology 39, 1998, pp. 185-201.

"Erbium-Doped Phosphate Glass Waveguide on Silicon With 4.1 dB/cm Gain at 1.535 μm," Yan et al., Appl. Phys. Lett, 71 (20), Nov. 17, 1997.

Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).

"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.

"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, vol. A196, No. 1-2, pp. 253-260.

"Advances in the Grinding Efficiency of Sintered Alumina Abrasives," Andreas Krell et al., *Journal of the American Ceramic Society*, 1996, vol. 79, No. 3, pp. 763-769.

"Interface modification for increased fracture toughness in reaction-formed yttrium aluminum garnet/alumina eutectic composites," Luke N. Brewer et al., 1999, vol. 14, No. 10, pp. 3907-3912.

Dow Jones Interactive Internet Printout on Jun. 20, 2001 for web address "http://ptg.djnr.com/ccroot/asp/publib/story.asp"; "China's Rare Earth Industry in the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "Elements: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug. 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-Il Mah et al., J. Am. Ceram. Soc., 83, [8], 2000, pp. 2088-2090.

"Phase Identification of $Al_2O_3/RE_3Al_5O_{12}$ and $Al_2O_3/REAlO_3$ (RE = Sm-Lu, Y) Eutectics", J. Crystal Growth, 218, 2000, pp. 67-73.

"Crystallization and Thermal Properties of $Al_2O_3$-$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects On Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., *Journal of Materials Science Letters*, vol. 14, 1995, pp. 265-267.

"Aspects of Synthesis of Decorite Opacified Glass", Keramika, *Glass and Ceramics*, vol. 58, Nos. 1-2, pp. 8-11, Jan. 2001.

"A New Ceramic Eutectic Composite with High Strength at 1873 K", Yoshiharu Waku, *Advanced Materials*, vol. 10, No. 8, 1998, pp. 615-617.

"Synthesis of Y-Al Garnet", Krokhin et al., *Glass and Ceramics*, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., *Journal of Materials Science*, vol. 31, 1996, pp. 4663-4670.

"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965.

"A ductile ceramic eutectic composite with high strength at 1,873 K", Waku et al., *Nature*, vol. 389, Sep. 1997, pp. 49-52.

"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597.

"Powder-Material Research Methods and Properties Polythermal Sections of the $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659.

"Metastable Phase Relationships in the System $Al_2O_3$-$ZrO_2$-$Y_2O_3$ ", Lakiz and Lopato, *Powder Metallurgy and Metal Ceramics*, vol. 35, Nos. 11-12, 1996, pp. 621-626.

"Solidus Surface and Phase Equilibria During the Solidification Of Alloys In The $Al_2O_3$-$ZrO_2$-$Y_2O_3$ System", Lakiza et al., *Powder Metallurgy and Metal Ceramics*, vol. 34, Nos. 1-2, 1995, pp. 64-67.

"Methods Of Investigation of Properties of Powder Materials, Interactions in the $Al_2O_3$-$ZrO_2$-$Y_2O_3$ System", Lakiza et al., *Powder Metallurgy and Metal Ceramics*, vol. 33, Nos. 9-10, 1994, pp. 486-490.

"Rapid Solidification of Ceramics a Technology Assessment", Brockway et al. *Metals and Ceramics Information Center*, MCIC Report, Jan. 1984 MCIC 84-49.

Figs. 311, 346, 350, 354-56, 373, and 716, *Phase Diagrams for Ceramists*, The American Ceramic Society, 1964, pp. 122, 236,138, 140, 144, 248.

Figs. 2340-44, 2363, 2370, 2374-75, 2382-83, 2385, 2387, 2390, and 2392, *Phase Diagrams for Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams for Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, *Phase Diagrams for Ceramists, vol. IV*, The American Ceramic Society, 1981, pp. 29, 125, 127,129-131, 133, 135-137, 139, 141, 143, 220, 228.

Fig. 6464, *Phase Diagrams for Ceramists, vol. VI*, The American Ceramic Society, 1981, p. 162.

Figs. 9262, and 9264, *Phase Diagrams for Ceramists, vol. XI, Oxides*, The American Ceramic Society, 1995, pp. 105-106.

"Phase Equilibria in the Yttrium Oxide-Alumina System", Toropov et al., *Bulletin of the Academy of Sciences, USSR*, Division of Chemical Science, No. 7, Jul. 1964, pp. 1076-1081, A translation of *Seriya Khimicheskaya*.

McKittrick, Joanna, et al., "Non-stoiciometry and defect structures in rapidly solidified $MgO$-$Al_2O_3$-$ZrO_2$ ternary eutectics," *Materials Sciences and Engineering* A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused-$Al_2O_3$-MgO-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride- $Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$-$Y_2O_3$-$ZrO_2$/$HfO_2$ Materials, and Methods of Making and Using the Same", filed Aug. 2, 2002, Rosenflanz having U.S. Appl. No. 10/211,638.

U.S. Patent Application entitled, "Abrasive Particles, Abrasive Articles, and Methods of Making and Using the Same", filed Aug. 2, 2002, Rosenflanz et al. having U.S. Appl. No. 10/211,598.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled, "Glass-Ceramics", filed Aug. 2, 2002, Rosenflanz having U.S. Appl. No. 10/211,044.

U.S. Patent Application entitled, "Alunmina-Zirconia, and Methods of Making and Using the Same", filed Aug. 2, 2002, Rosenflanz et al. having U.S. Appl. No. 10/211,620.

U.S. Patent Application entitled, "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning," filed Aug. 2, 2002, Rosenflanz et al. having U.S. Appl. No. 10/211,684.

U.S. Patent Application entitled "Methods of Making Ceramics", filed Feb. 5, 2003, Anderson et al. having U.S. Appl. No. 10/358,765.

U.S. Patent Application entitled "Ceramics and Methods of Making the Same", filed Feb. 5, 2003, Celikkaya et al. having U.S. Appl. No. 10/358,910.

U.S. Patent Application entitled "$Al_2O_3$-$La_2O_3$-$Y_2O_3$-MgO Ceramics, and Methods of Making the Same", filed Feb. 5, 2003, Celikkaya et al. having U.S. Appl. No. 10/358,855.

U.S. Patent Application entitled "Methods of Making $Al_2O_3$-$SiO_2$ Ceramics", filed Feb. 5, 2003, Celikkaya et al. having U.S. Appl. No. 10/358,708.

* cited by examiner

METHODS OF MAKING CERAMIC PARTICLES

BACKGROUND

A large number of glass and glass-ceramic materials are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700-800° C. The glass-ceramics tend to be more temperature resistant than the glass from which they are formed.

In addition, many properties of known glasses and glass-ceramics are limited by the intrinsic properties of glass-formers. For example, for $SiO_2$-, $B_2O_3$-, and $P_2O_5$-based glasses and glass-ceramics, the Young's modulus, hardness, and strength are relatively low. Such glass and glass-ceramics generally have inferior mechanical properties as compared, for example, to $Al_2O_3$ or $ZrO_2$.

Although some less or non-conventional glasses such as glasses based on rare earth oxide-aluminum oxide (see, e.g., U.S. Pat. No. 6,482,758 (Weber) and Japanese Document No. JP 2000-045129, published Feb. 15, 2000) are known, additional novel glasses and glass-ceramic, as well as use for both known and novel glasses and glass-ceramics, is desired.

For many uses of glasses and glass-ceramics, the glass or glass-ceramic must be in a specific form or shape. Additional methods for making shapes or forms of glasses and glass-ceramics is desired.

SUMMARY

The present invention provides methods for making ceramic particles such as particles comprising glass (including glass particles) and particles comprising glass-ceramic (including glass-ceramic particles).

In one exemplary method for making particles, the method comprising:
providing first and second generally opposed surfaces;
providing a mold comprising a plurality of at least one of particle openings or cavities;
introducing a melt to at least a portion of the plurality of at least one of particle openings or cavities of the mold;
passing the mold and the melt between the first and second generally opposed, surfaces such that the melt in the at least one of particle openings or cavities is under pressure; and
at least partially cooling the melt in the at least one of particle openings or cavities to provide ceramic particles comprising glass (including glass particles). Typically, a ceramic particle comprises glass in an amount of at least 50, 55, 60, 65, 70, 75, 80, 85, 90, 95, or even 100 percent by volume, based on the total volume of the ceramic particle. Optionally, the method further comprises heat-treating the glass to convert at least a portion of the glass to glass-ceramic and provide ceramic particles comprising glass-ceramic (including glass-ceramic particles) (in some embodiments, abrasive particles). Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

In another exemplary method for making ceramic particles, the method comprising:
providing a roll comprising a plurality of at least one of particle openings or cavities;
introducing a melt to at least a portion of the plurality of at least one of particle openings or cavities; and
at least partially cooling the melt in the at least one of particle openings or cavities to provide ceramic particles comprising glass (including glass particles). Optionally, the method further comprises applying a surface to the melt in the at least one of openings or cavities such that the melt in the particle opening is under pressure. Typically, a ceramic particle comprises glass in an amount of at least 50, 55, 60, 65, 70, 75, 80, 85, 90, 95, or even 100 percent by volume, based on the total volume of the ceramic particle. Optionally, the method further comprises heat-treating the glass to convert at least a portion of the glass to glass-ceramic and provide ceramic particles comprising glass-ceramic (including glass-ceramic particles) (in some embodiments, abrasive particles). Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

In another exemplary method for making ceramic particles, the method comprising:
providing a roll comprising a plurality of particle openings, wherein the roller has an inner major surface and an outer major surface, and wherein the particle openings extend between the outer major surface and the inner major surface;
introducing a melt to at least a portion of the plurality of particle openings; and
at least partially cooling the melt in the particle openings to provide ceramic particles comprising glass (including glass particles). The melt may be introduced into the particle openings from the outer major surface of the roller such that the melt flows toward the inner major surface of the roller. Alternatively, the melt may be introduced into the particle openings from the inner major surface of the roller such that the melt flows toward the outer major surface of the roller. Typically, the method further comprises use of a surface positioned to facilitate formation of the particles (e.g., the surface may cut or break off melt and/or glass exiting the particle openings). Typically, a ceramic particle comprises glass in an amount of at least 50, 55, 60, 65, 70, 75, 80, 85, 90, 95, or even 100 percent by volume, based on the total volume of the ceramic particle. Optionally, in some embodiments, the method further comprises heat-treating the glass to convert at least a portion of the glass to glass-ceramic and provide ceramic particles comprising glass-ceramic (including glass-ceramic particles) (in some embodiments, abrasive particles). Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

In some embodiments of methods according to the present invention, the melt, the glass, and the glass-ceramic comprises at least 35 (in some embodiments, at least 40, 45, 50, 55, 60, 65, 70, or even at least 75) percent by weight $Al_2O_3$, based on the total weight of the melt, glass, or glass-ceramic, respectively and a first metal oxide other than $Al_2O_3$ (optionally, a second, third, etc. different metal oxide other than $Al_2O_3$ (e.g., $Y_2O_3$, REO, MgO, $TiO_2$, $Cr_2O_3$, CuO, NiO, $ZrO_2$, and, $Fe_2O_3$)), wherein the melt, glass, or glass-ceramic, respectively, contains not more than 10 (in some embodiments, not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass, and the glass-ceramic comprises at least 35 (in some embodiments, at least 40, 45, 50, 55, 60, 65, 70, or even at least 75) percent by weight $Al_2O_3$, based on the total weight of the melt, glass, or glass-ceramic, respectively, a first metal oxide other than $Al_2O_3$, and a second, different metal oxide other than $Al_2O_3$ (e.g., $Y_2O_3$, REO, MgO, $TiO_2$, $Cr_2O_3$, CuO, NiO, $ZrO_2$, and, $Fe_2O_3$), wherein the $Al_2O_3$, first metal oxide, and second metal oxide collectively comprise at least 80 (in some embodiments, at least 75, 80, 85, 90, 95, or 100) percent by weight of the melt, glass, or glass-ceramic, respectively, and wherein the melt, glass, or glass-ceramic contains not more than 20 (in some embodiments, not more than 15, 10, 5, 4, 3, 2, 1, or even zero) percent by weight collectively $As_2O_3$, $B_2O_3$, $GeO_2$, $P_2O_5$, $SiO_2$, $TeO_2$, and $V_2O_5$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass (including glass present in a glass-ceramic), and the glass-ceramic comprises $Al_2O_3$ and at least one of REO or $Y_2O_3$, wherein at least 80 (in some embodiments, at least 85, 90, 95, or even 100) percent by weight of the melt, glass, or glass-ceramic, respectively, collectively comprises the $Al_2O_3$ and the at least one of REO or $Y_2O_3$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass (including glass present in a glass-ceramic), and the glass-ceramic comprises $Al_2O_3$, at least one of REO or $Y_2O_3$, and at least one of $ZrO_2$ or $HfO_2$, wherein at least 80 (in some embodiments, at least 85, 90, 95, or even 100) percent by weight of the melt, glass, or glass-ceramic, respectively, collectively comprises the $Al_2O_3$, at least one of REO or $Y_2O_3$, and at least one of $ZrO_2$ or $HfO_2$, based on the total weight of the malt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass (including glass present in a glass-ceramic), and the glass-ceramic comprises $Al_2O_3$ and at least one of REO or $Y_2O_3$, wherein at least 60 (in some embodiments, 65, 70, 75, 80, 85, 90, 95, or even at least 100) percent by weight of the melt, glass, or glass-ceramic, respectively, collectively comprises the $Al_2O_3$ and the at least one of REO or $Y_2O_3$, and wherein the melt, glass, or glass-ceramic contains not more than 20 (in some embodiments, not more than 15, 10, 5, or even zero) percent by weight $SiO_2$ and not more than 20 (in some embodiments, not more than 15, 10, 5, or even zero) percent by weight $B_2O_3$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass, and the glass-ceramic comprises $Al_2O_3$, at least one of REO or $Y_2O_3$, and at least one of $ZrO_2$ or $HfO_2$, wherein at least 60 (in some embodiments, 65, 70, 75, 80, 85, 90, 95, or even at least 100) percent by weight of the melt, glass, or glass-ceramic, respectively, collectively comprises the $Al_2O_3$, at least one of REO or $Y_2O_3$, and at least one of $ZrO_2$ or $HfO_2$, and wherein the melt, glass, or glass-ceramic, respectively, contains not more than 20 (in some embodiments, not more than 15, 10, 5, or even zero) percent by weight $SiO_2$ and not more than 20 (in some embodiments, not more than 15, 10, 5, or even zero) percent by weight $B_2O_3$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass, and the glass-ceramic comprises $Al_2O_3$ and at least one of REO or $Y_2O_3$, wherein at least 60 (in some embodiments, 65, 70, 75, 80, 85, 90, 95, or even at least 100) percent by weight of the melt, glass, or glass-ceramic, respectively, comprise the $Al_2O_3$ and the at least one of REO or $Y_2O_3$, and wherein the melt, glass, or glass-ceramic, respectively, contains not more than 40 (in some embodiments, not more than 35, 30, 25, 20, 15, 10, 5, or even zero) percent by weight collectively $SiO_2$, $B_2O_3$, and $P_2O_5$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In some embodiments of methods according to the present invention, the melt, the glass, and the glass-ceramic comprises $Al_2O_3$, at least one of REO or $Y_2O_3$, and at least one of $ZrO_2$ or $HfO_2$, wherein at least 60 (in some embodiments, 65, 70, 75, 80, 85, 90, 95, or even at least 100) percent by weight of the melt, glass, or glass-ceramic, respectively, comprise the $Al_2O_3$, at least one of REO or $Y_2O_3$, and at least one of $ZrO_2$ or $HfO_2$, and wherein the melt, glass, or glass-ceramic, respectively, contains not more than 40 (in some embodiments, not more than 35, 30, 25, 20, 15, 10, 5, or even zero) percent by weight collectively $SiO_2$, $B_2O_3$, and $P_2O_5$, based on the total weight of the melt, glass, or glass-ceramic, respectively. Embodiments of the glass-ceramic have an average hardness of at least 13 GPa, 14 GPa, 15 GPa, 16 GPa, 17 GPa, 18 GPa, or even at least 19 GPa.

In one exemplary method for making particles, the method comprising:
  providing first and second generally opposed surfaces;
  providing a mold comprising a plurality of at least one of particle openings or cavities;
  introducing a melt to at least a portion of the plurality of at least one of particle openings or cavities of the mold;
  passing the mold and the melt between the first and second generally opposed surfaces, such that the melt in the at least one of particle openings or cavities is under pressure;
  at least partially cooling the melt in the at least one of particle openings or cavities to provide ceramic particles comprising glass (including glass particles); and
  heat-treating the glass to convert at least a portion of the glass to glass-ceramic and provide ceramic particles comprising glass-ceramic (including glass-ceramic particles) (in some embodiments, abrasive particles), wherein the glass-ceramic has an average hardness of at least 13 GPa, 14 GPa, 15 GPa, 16 GPa, 17 GPa, 18 GPa, or even at least 19 GPa. Typically, a ceramic particle comprises glass in an amount of at least 50, 55, 60, 65, 70, 75, 80, 85, 90, 95, or even 100 percent by volume, based on the total volume of the particle. Optionally, the method further comprises heat-treating the glass to convert at least a portion of the glass to glass-ceramic and provide ceramic particles comprising glass-ceramic (including glass-ceramic particles) (in some embodiments, abrasive particles). Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

In another exemplary method for making ceramic particles, the method comprising:
  providing a roll comprising a plurality of at least one of particle openings or cavities;
  introducing a melt to at least a portion of the plurality of at least one of particle openings or cavities;
  at least partially cooling the melt in the at least one of particle openings or cavities to provide ceramic particles comprising glass (including glass particles); and
  heat-treating the glass to convert at least a portion of the glass to glass-ceramic and provide ceramic particles comprising glass-ceramic (including glass-ceramic particles) (in some embodiments, abrasive particles), wherein the glass-ceramic has an average hardness of at least 13 GPa, 14 GPa, 15 GPa, 16 GPa, 17 GPa, 18 GPa, or even at least 19 GPa. Optionally, the method further comprises applying a surface to the melt in the cavities such that the melt in the cavities is under pressure. Typically, the ceramic particle comprises glass in an amount of at least 50, 55, 60, 65, 70, 75, 80, 85, 90, 95, or even 100 percent by volume, based on the total volume of the ceramic particle. Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

In another exemplary method for making ceramic particles, the method comprising:
  providing a roll comprising a plurality of particle openings, wherein the roller has an inner major surface and an outer major surface, and wherein the particle openings extend between the outer major surface and the inner major surface;
  introducing a melt to at least a portion of the plurality of particle openings;
  at least partially cooling the melt in the particle openings to provide ceramic particles comprising glass; and
  heat-treating the ceramic particles to convert at least a portion of the glass to glass-ceramic particles comprising glass-ceramic (including glass-ceramic particles) (in some embodiments, abrasive particles), wherein the glass-ceramic has an average hardness of at least 13 GPa, 14 GPa, 15 GPa, 16 GPa, 17 GPa, 18 GPa, or even at least 19 GPa. The melt may be introduced into the particle openings from the outer major surface of the roller such that the melt flows toward the inner major surface of the roller. Alternatively, the melt may be introduced into the particle openings from the inner major surface of the roller such that the melt flows toward the outer major surface of the roller. Typically, the method further comprises use of a surface positioned to facilitate formation of the particles (e.g., the surface may cut or break off melt and/or glass exiting the particle openings). Typically, the ceramic particle comprises glass in an amount of at least 50, 55, 60, 65, 70, 75, 80, 85, 90, 95, or even 100 percent by volume, based on the total volume of the ceramic particle. Typically, embodiments of the heat-treated ceramic particles comprise glass-ceramic in an amount of at least 50, 55, 60, 65, 70, 75, 80, 85, 90, 95, or even 100 percent by volume, based on the total volume of the ceramic particle.

Some embodiments of glass-ceramics according to the present invention may comprise glass in an amount, for example, of at least 1, 2, 3, 5, 10, 15, 20, 25, 30, 35, 40, 45, 50, 55, 60, 65, 70, 75, 80, 85, 90, 95, or even 100 percent by volume, based on the total volume of the glass-ceramic. Some embodiments of glass-ceramics according to the present invention may comprise crystalline ceramic in an amount, for example, of at least 1, 2, 3, 5, 10, 15, 20, 25, 30, 35, 40, 45, 50, 55, 60, 65, 70, 75, 80, 85, 90, 95, 97, 98, 99, or even 100 percent by volume, based on the total volume of the glass-ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be crystalline, or portions glass and portions crystalline. For example if a glass-ceramic comprises $Al_2O_3$ and $ZrO_2$, the $Al_2O_3$ and $ZrO_2$ may each be in an glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha Al₂O₃), it may be present as crystalline Al$_2$O$_3$ and/or as part of one or more crystalline complex Al$_2$O$_3$.metal oxides.

Abrasive particles made according the present invention can be incorporated into an abrasive article, or used in loose form. Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards.

In some embodiments, the particle openings or cavities may be the same size so as to provide abrasive particles having generally the same size and shape. In some embodiments, the particle openings or cavities may be of range of selected sizes and/or have a variety of selected shapes so as to provide abrasive particles having a range of sizes and/or shapes. If the resulting distribution of particles is as desired grading may be unnecessary.

In one aspect, the present invention provides a plurality of abrasive particles having a specified nominal grade, wherein at least a portion of the plurality of abrasive particles are abrasive particles made according to the present invention. In some embodiments, at least 5, 10, 15, 20, 25, 30, 35, 40, 45, 50 55, 60, 65, 70, 75, 80, 85, 90, 95, or even 100 percent by weight of the plurality of abrasive particles are the abrasive particles made according to the present invention, based on the total weight of the plurality of abrasive particles.

For some embodiments of methods according to the present invention, the method further comprises grading the abrasive particles made according to the present invention to provide a plurality of particles having a specified nominal grade. For some embodiments of methods according to the present invention, further comprises grading the particles comprising glass to be heat-treated to provide a plurality of particles having a specified nominal grade.

In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles made according to the present invention.

Abrasive articles comprise binder and a plurality of abrasive particles, wherein at least a portion of the abrasive particles are the abrasive particles made according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles made according to the present invention, based on the total weight of the abrasive particles in the abrasive article.

The present invention also provides a method of abrading a surface, the method comprising:

contacting abrasive particles made according to the present invention with a surface of a workpiece; and moving at least one of the abrasive particles made according to the present invention or the contacted surface to abrade at least a portion of the surface with at least one of the abrasive particles made according to the present invention.

DETAILED DESCRIPTION

The present invention provides methods for making ceramic particles from melts.

Figure 4:
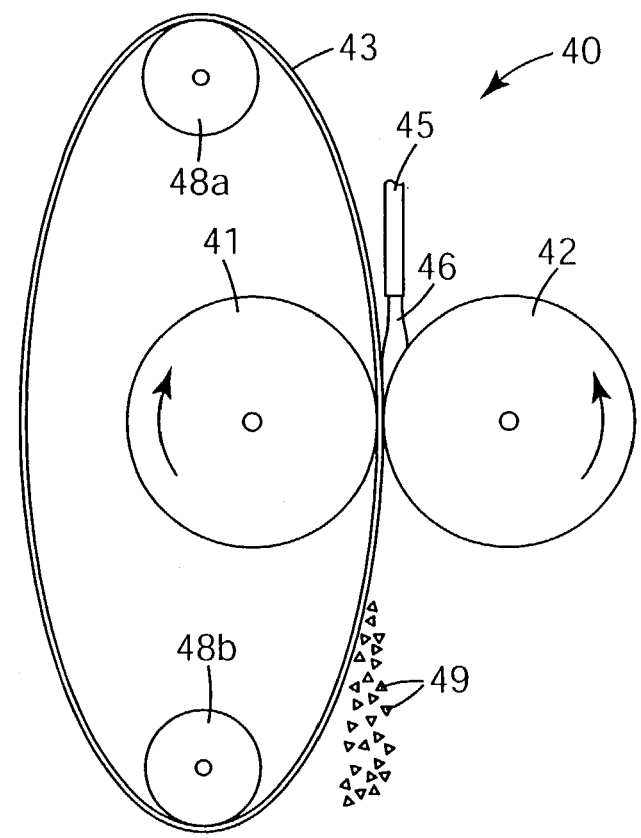
FIG. 4 is a side view of an exemplary apparatus for practicing embodiments of methods according to the present invention.
Figure 4A:
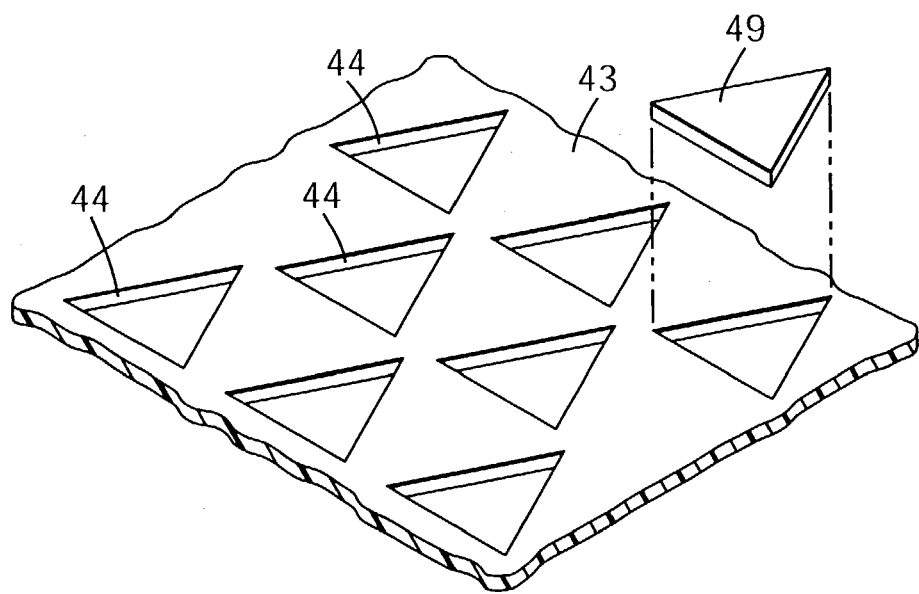
FIG. 4a is a partial front view of a portion of the apparatus illustrated in FIG. 4.

One exemplary apparatus 40 for making ceramic particles 49 comprising glass is shown in FIGS. 4 and 4a. Apparatus 40 includes first roller 41, second roller 42, sheet mold 43 having particle openings 44, melt delivery tube 45, and rollers 48a, 48b. Rollers 41 and 42 are driven by a drive mechanism (not shown). In some embodiments of apparatus 40, rollers 48a, 48b are also driven. Melt 46 is feed into particle openings 44 of mold 43, mold 43 having melt 46 in particle openings 44 passes between rollers 41 and 42, typically such that melt 46 in particle openings 44 of mold 43 is under pressure. Melt 46 in particle openings 44 of mold 43 at least partially cools in mold to 43. The resulting cooled melt from openings 44 of mold 43 are ceramic particles 49 comprising glass. Optionally, for example, the particle openings are particle cavities. Optionally, for example, the mold includes both particle openings and cavities.

Figure 5:
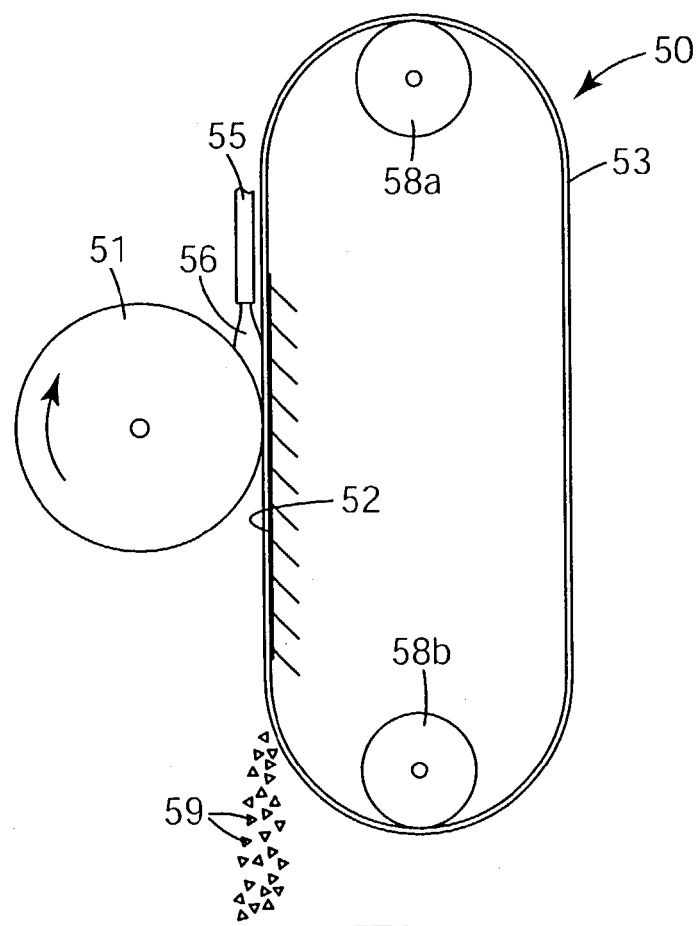
FIG. 5 is a side view of an exemplary apparatus for practicing embodiments of methods according to the present invention.
Figure 5A:
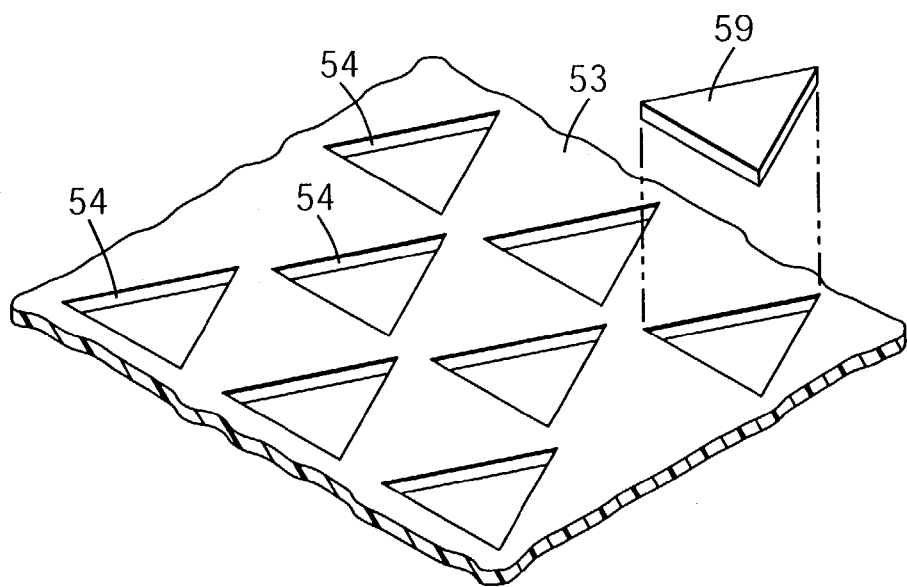
FIG. 5a is a partial front view of a portion of the apparatus illustrated in FIG. 5.

Another exemplary 50 apparatus for making ceramic particles 59 comprising glass is shown in FIGS. 5 and 5a. Apparatus 50 includes roller 51, surface 52, sheet mold 53 having particle openings 54, melt delivery tube 55, and rollers 58a, 58b. Roller 51 is driven by a drive mechanism (not shown). In some embodiments of apparatus 50, rollers 58a, 58b are also driven. Melt 56 is feed into particle openings 54 of mold 53. Mold 53 having melt 56 in particle openings 54 is passed between roller 51 and surface 52, typically such that melt 56 in particle openings 54 of mold 53 is under pressure. Melt 56 particle openings 54 of mold 53 at least partially cools in mold to 53. The resulting cooled melt from openings 54 of mold 53 are ceramic particles 59 comprising glass. Optionally apparatus 50 can be used to make ceramic particles comprising glass without the use of surface 52. Optionally, for example, the particle openings are particle cavities. Optionally, for example, the mold includes both particle openings and cavities.

Figure 6:
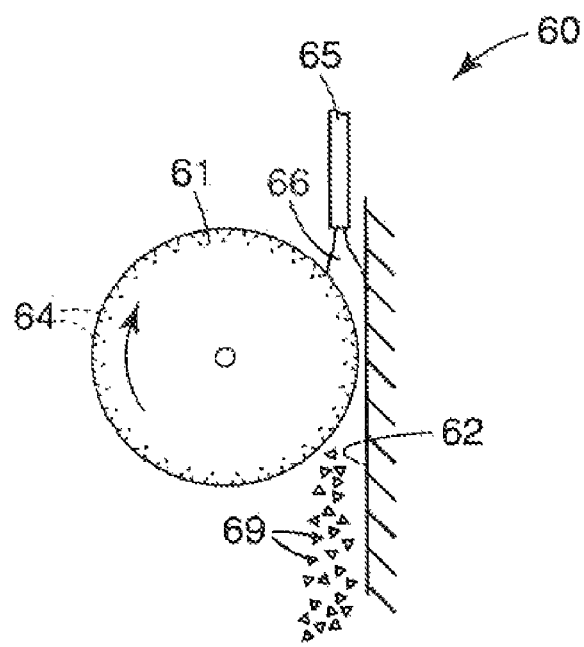
FIG. 6 is a side view of an exemplary apparatus for practicing embodiments of methods according to the present invention.
Figure 6A:
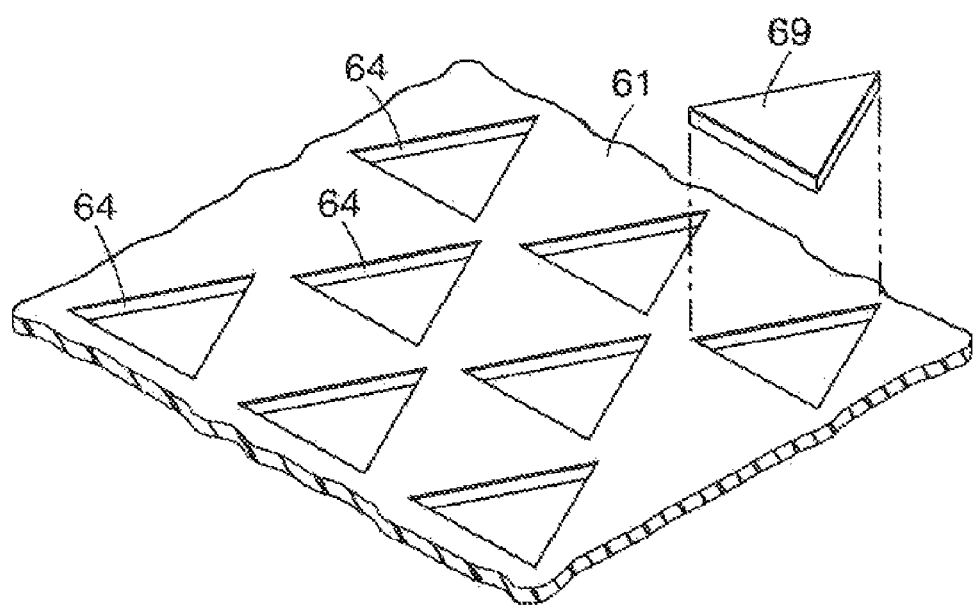
FIG. 6a is a partial front view of a portion of the apparatus illustrated in FIG. 6.

Another exemplary apparatus 60 for making the ceramic particles 69 comprising glass is shown in FIGS. 6 and 6a. Apparatus 60 includes roller 61 having particle cavities 64. surface 62, and melt delivery tube 65. Roller 61 is driven by a drive mechanism (not shown). Melt 66 is feed into particle cavities 64 of roller 61 Particle cavities 64 of roller 61 having melt 66 therein rotates across substrate 62 to facilitate filling the cavities with melt 66. Melt 66 in particle cavities 64 of at least partially cools in cavities 64. The resulting cooled melt from cavities 64 are ceramic particles 69 comprising glass. Optionally apparatus 60 can be used to make with ceramic particles comprising glass without the use of surface 62.

Figure 7:
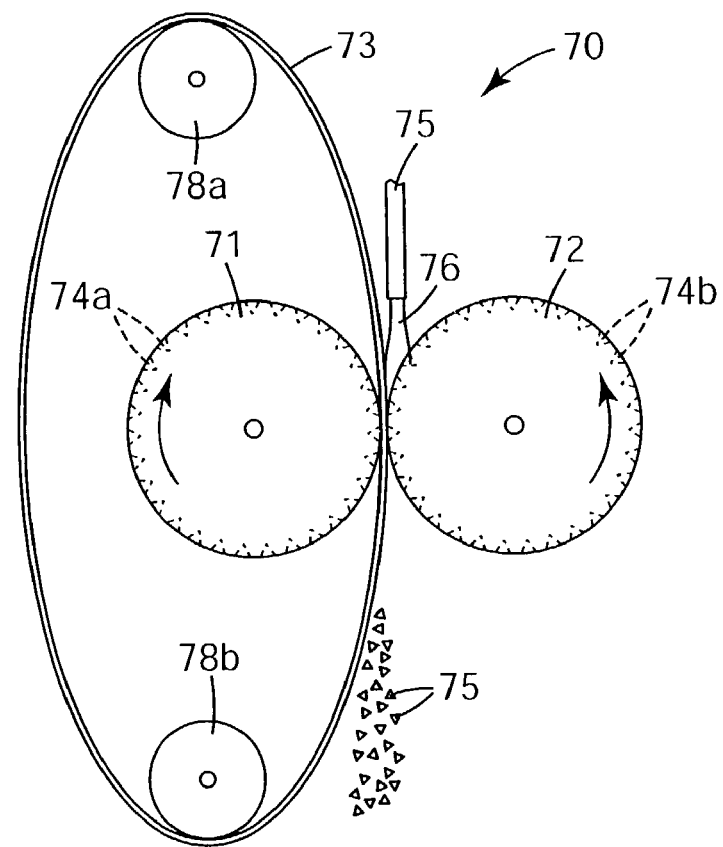
FIG. 7 is a side view of an exemplary apparatus for practicing embodiments of methods according to the present invention.
Figure 7A:
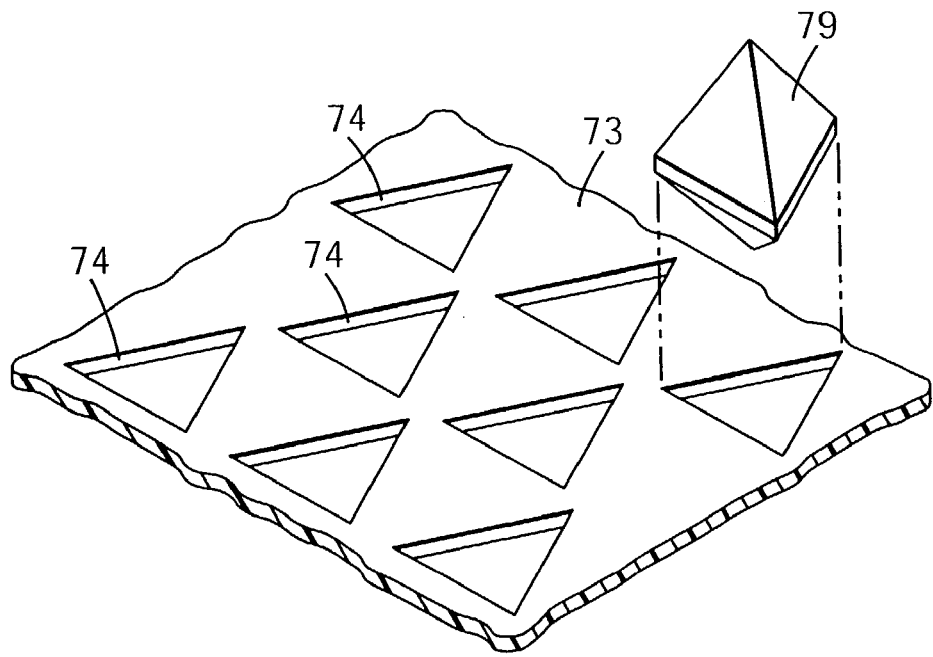
FIG. 7a is a partial front view of a portion of the apparatus illustrated in FIG. 7.

Another exemplary apparatus 70 for making ceramic particles 79 comprising glass is shown in FIGS. 7 and 7a. Apparatus 70 includes first roller 71 having particle cavities 74a, second roll 72, melt delivery tube 75. Rollers 71 and 72 are driven by a drive mechanism (not shown). In some embodiments of apparatus 70, rollers 78a, 78b are also driven. Melt 76 is fed into particle cavities 74a of roller 71. Particle cavities 74a of roller 71 having melt 76 therein rotates across outer surface of roller 72 to fiicilitate filling the cavities with melt 76. The resulting cooled melt from cavities 74a are ceramic particles 79 comprising glass. Optionally, apparatus 70 huffier includes mold 73 having openings. Optionally, second roller 72 also has at least one of particle openings or cavities 74b.

Figure 8:
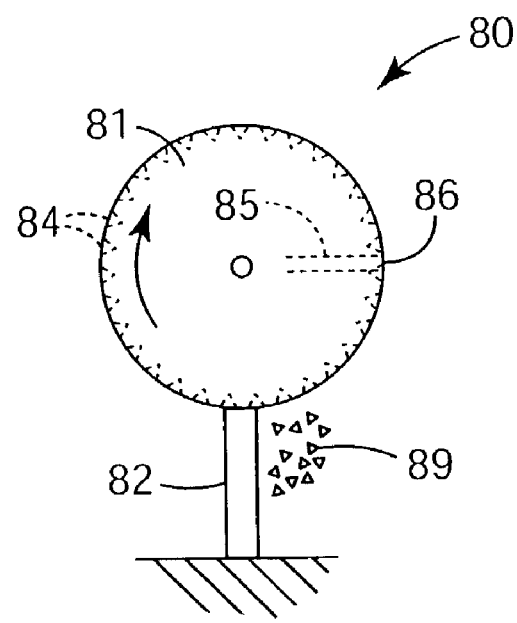
FIG. 8 is a side view of an exemplary apparatus for practicing embodiments of methods according to the present invention.
Figure 8A:
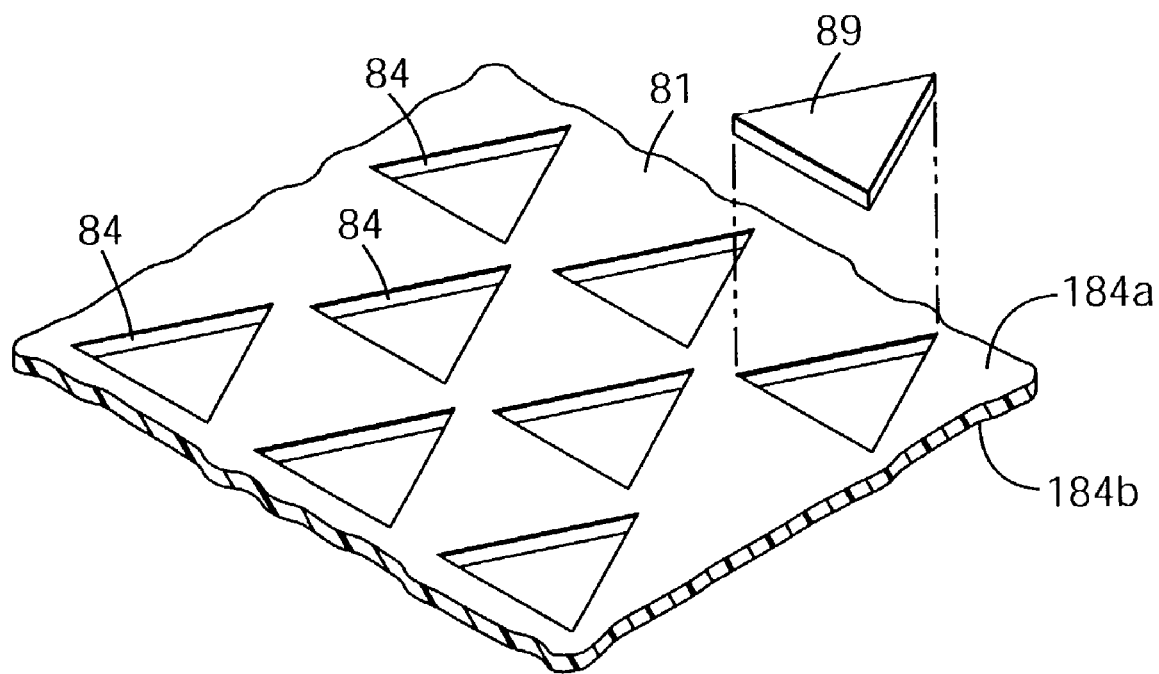
FIG. 8a is a partial front view of a portion of the apparatus illustrated in FIG. 8.

Another exemplary apparatus 80 for making ceramic particles 89 comprising glass is shown in FIGS. 8 and 8a. Apparatus 80 includes roller 81 having particle openings 84, melt delivery tube 85, and surface 82. Roller 81 is driven by a drive mechanism (not shown). Melt 86 is feed into particle openings 84 of roller 81 such that melt 86 passes outwardly through particle openings 84 (i.e., openings 84 extends between inner major surface 184a and outer major surface 184b) and contacts surface 82, causing the melt (if not solidified into glass) or glass to break off into particles 89. Alternatively, for example, roller 81 is stationary and surface 82 rotates causing the melt (if not solidified into glass) or glass to break of into particles.

Figure 9:
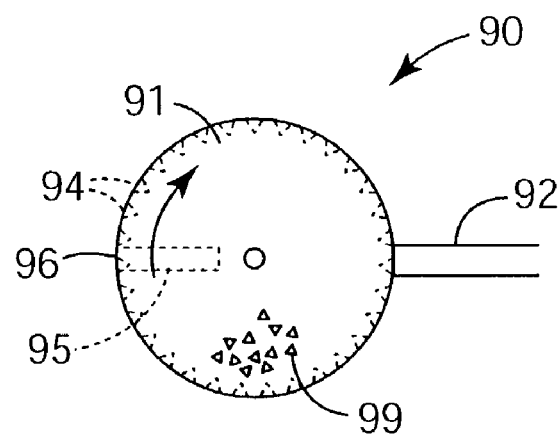
FIG. 9 is a side view of an exemplary apparatus for practicing embodiments of methods according to the present invention.
Figure 9A:
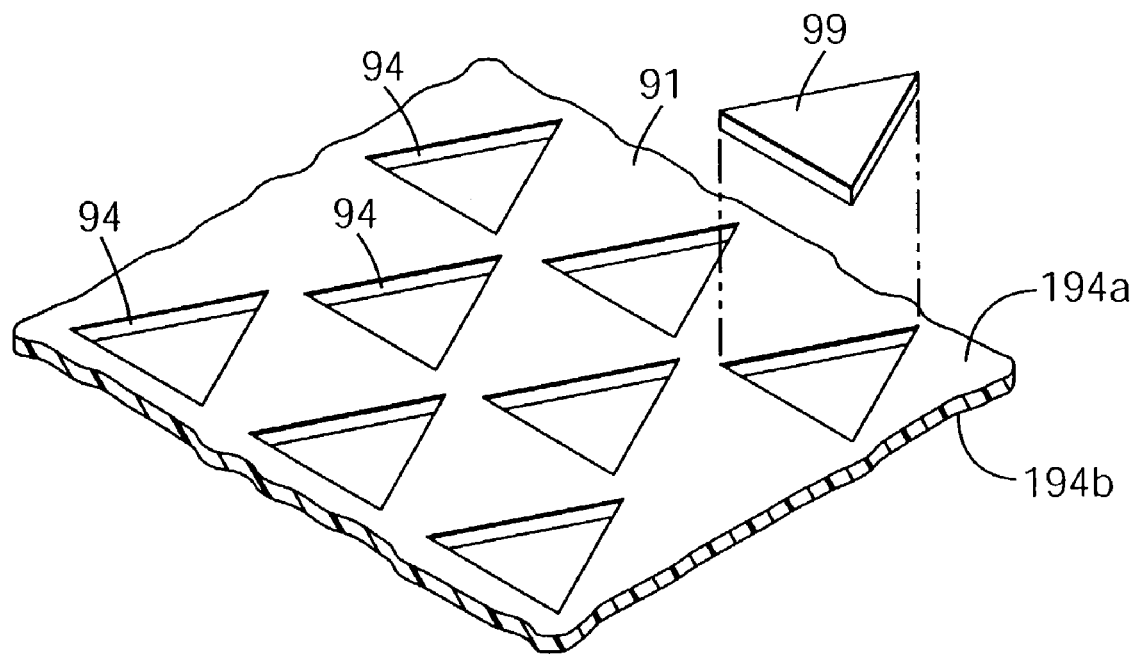
FIG. 9a is a partial front view of a portion of the apparatus illustrated in FIG. 9.

Another exemplary apparatus 90 for making ceramic particles 99 comprising glass is shown in FIGS. 9 and 9a. Apparatus 90 includes roller 91 having particle openings 94, melt delivery tube 95, and surface 92, Roller 91 is driven by a drive mechanism (not shown). Melt 96 is fed into particle openings 94 of roller 91 such that melt 96 presses inwardly through particle openings 94 (i.e., opening 94 extends between inner major surface 194a and outer major surface 194b) and contacts surface 92, causing the melt (if not solidified into glass) or glass to break off into particles 99 comprising glass. Alternatively, fir example, roller 91 is stationary and surface 92 rotates causing the melt (if not solidified into glass) or glass to break off into particles.

The melt can be delivered to the particle openings or cavities in a variety of ways. Delivery of the melt may be in a continuous, batch, or semi-continuous manner. For example, the melt may be poured directly from the melting furnace (including inductively, resistively or arc melting furnaces) to the mold openings or cavities, by tilting the furnace containing the melt. In another embodiment, the melt may be delivered to the particle openings or cavities, for example, via a delivery tube (or other delivery surface) attached at the bottom of the furnaces or container containing the melt. Such delivery tube or surface is made of a material capable of withstanding the relatively high melt temperatures, and the stresses (e.g., thermal shock) inherently arising from the process. Typically, it is desirable for the delivery tube material, as well as other surfaces that come into contact with the melt, not to significantly react with the melt, alter the composition of the melt or introduce impurities into the melt. In aspect, it is typically desirable for the melt not to wet the delivery tube. In some embodiments, it may be desirable to apply mechanical or gas pressure (in addition to gravitational) to force or otherwise control the flow of the melt through the delivery tube. Examples of suitable materials for tubes and/or a delivery surface contacting the melt include ceramic refractories and graphite. In some cases, the delivery tube or surface is insulated, or heated (e.g., inductively) to keep the melt in the tube or on the surface in a molten, flowable state. It is also within the scope of the present invention to indirectly deliver the melt to the particle openings or cavities, for example, by delivering the melt to an "opposed surface" which in turn delivers the melt to the particle openings and/or cavities. It is also within the scope of the invention, for example, to use techniques such as flame forming, plasma and thermal spraying equipment to form and deliver the melt to the particle opening or cavities.

The rollers, molds, surfaces, etc. can be made of a variety of materials including metals (e.g., steels (including stainless steel and alloy steels), copper, brass, aluminum and aluminum alloys, and nickel) or graphite. Generally, suitable materials have high thermal conductivity and good thermal stability against rapid temperature changes and good stability against mechanical shocks. In some embodiments, the molds or various surfaces may employ a liner to facilitate, for example, more cost efficient in maintenance and/or initial design and acquisition of the surfaces and molds. For example the core of the surfaces and molds may be of one material while the liners may be another with the desired thermal, chemical, and mechanical properties. The liners may be more or less expensive, easier to machine than the core, etc. Further, liners may be replaced after one or more uses. To improve the heat removing ability of the rollers, molds, surfaces, etc. they may be cooled, for example, by circulating liquid (e.g., water) and/or by blowing a cooling gas (e.g., air, nitrogen, and argon) on them.

The rollers, surfaces, molds, openings, and cavities can be in a variety of sizes, depending, for example, on the size of the operation, the desired size, shape, and/or quantity of particles, the amount of melt to be processed, and/or the flow rate of the melt.

To improve the cooling rates (by increasing the contact surface area), the surfaces, molds, etc. (including the particle openings and/or cavities) may have in addition to the particle opening or cavities, for example surface finishes and patterns (including engraved surfaces and patterns) on them. Such surface finishes and/or patterns may reproduce on the resulting shaped particles. The speed at which the rollers, mold, and/or surfaces move may depend, for example, on the desired cooling rates, the material output of the process, glass yield, etc. In some embodiments, the melt may not wet the surfaces or the molds forming beads or droplets on the surfaces or molds and may not fill the cavities and openings. In such cases it may be necessary to apply pressure on the melt to spread it and force it to fill the cavities or openings. The pressure needed depends on the melt properties such as viscosity, and the desired thickness of the melt. Typically, the thickness and volume of the melt is such that the melt flows and fills the particle opening or cavities before solidifying. Also, the thickness and volume of the melt in an opening or cavity is typically small enough to enhance the heat transfer and increase glass yield, but if the cooling rates are too high the melt may not completely fill the mold openings and cavities and/or may not assume the desired shapes.

Typically, solidified particles shrink and dislodge themselves from the mold cavities. In some cases, the mold comprising the particles must be flexible such that the mold can be bent in different directions to further assist in removing the solidified particles.

The molds, rollers, etc. comprising openings and/or cavities can be prepared in a variety of ways for example by punching particular shapes on the mold, roller, etc. (i.e., by perforating) or by cutting, computer and/or laser assisted cutting and the like. The particle openings or cavities present on the molds rollers, etc can be of any shape and size as desired (including combinations of shapes). Exemplary openings or cavities include those that are triangles, squares, cubes, rectangles, circles, cylindirical, half-cylindiricalers, stars, crescent, semi-circular, pyramidal (e.g., triangular pyramids and squared pyramids), ellipsoidal, flaky, V-shaped, and other polygonal shapes. The number (i.e., the percent open area on, for example, the mold and/or roller) and types of openings and cavities on a mold, roller, etc. may vary significantly. In addition, the particle openings and cavities may be oriented with respect to each other in a variety of ways (e.g., in a linear, diagonal, circular or in any other pattern). Typically, it is desirable to have sufficient separation between the particle openings and cavities to act as heat sink. Molds can be obtained commercially, for example, from Herrington & King Perforating Company, Chicago, Ill., or can be machined or otherwise constructed specifically for the desired application.

Typically, the particles have base sizes of from a few micrometers up to a few millimeters for abrasive applications. Other sizes may also be useful for other applications.

The melts used in the methods of the present invention, may be prepared by re-melting glasses of the desired compositions and/or directly from selected raw materials to provide the desired glass.

Raw materials for forming glasses and the melts include the following.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$-metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide-other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Other useful metal oxides may also include, on a theoretical oxide basis, $BaO$, $CaO$, $Cr_2O_3$, $CoO$, $Fe_2O_3$, $GeO_2$, $HfO_2$, $Li_2O$, $MgO$, $MnO$, $NiO$, $Na_2O$, $Sc_2O_3$, $SrO$, $TiO_2$, $ZnO$, $ZrO_2$, and combinations thereof. Sources, including commercial sources, include the oxides themselves, metal powders, complex oxides, ores, carbonates, acetates, nitrates, chlorides, hydroxides, etc.

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

For embodiments comprising $ZrO_2$ and $HfO_2$, the weight ratio of $ZrO_2$:$HfO_2$ may be in a range of 1:zero (i.e., all $ZrO_2$; no $HfO_2$) to zero:1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 15, 10, and 5 parts $HfO_2$ and a corresponding amount of $ZrO_2$.

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates or minimizes insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of glass that otherwise could not be made, or could not be made in the desired size range. Another advantage of the invention include, in forming the glasses, that many of the chemical and physical processes such as melting, densification and spherodizing can be achieved in a short time, so that very high quench rates may be achieved. For additional details, see co-pending application having U.S. Ser. No. 10/211,639, filed the Aug. 2, 2002, the disclosure of which is incorporated herein by reference.

In one aspect of the invention, the raw materials (which may include or be, for example glass (i.e., glass to be re-melted) and/or ceramic particles comprising glass) are fed independently to form the molten mixture. In another aspect of the invention, certain raw materials are mixed together, while other raw materials are added independently into the molten mixture. In some embodiments, for example, the raw materials are combined or mixed together prior to melting. The raw materials may be combined in any suitable and known manner to form a substantially homogeneous mixture. These combining techniques include ball milling, mixing, tumbling and the like. The milling media in the ball mill may be metal balls, ceramic balls and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake like mixture may then be broken up or crushed into the desired particle size prior to melting. Alternatively, for example, spray-drying techniques may be used. The latter typically provides spherical particulates of a desired oxide mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), wherein at least 90 (in some embodiments, 95, or even 100) percent by weight of the particulate, although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and glasses and/or the desired composition.

Furthermore, in some cases, for example, when particulate material is fed in to a flame or thermal or plasma spray apparatus, to form the melt, it may be desirable for the particulate raw materials to be provided in a range of particle sizes. Although not wanting to be bound by theory, it is believed that this maximizes the packing density and strength of the feed particles. In general the coarsest raw material particles are smaller than the desired melt or glass particle sizes. Further, raw material particles that are too coarse, tend to have insufficient thermal and mechanical stresses in the feed particles, for example, during a flame forming or plasma spraying step. The end result in such cases is generally, fracturing of the feed particles in to smaller fragments, loss of compositional uniformity, loss of yield in desired glass particle sizes, or even incomplete melting as the fragments generally change their trajectories in a multitude of directions out of the heat source.

The glasses and ceramics comprising glass can be made, for example, by heating (including in a flame or plasma) the appropriate metal oxide sources to form a melt, desirably a homogenous melt, and then rapidly cooling the melt to provide glass. Some embodiments of glasses can be made, for example, by melting the metal oxide sources in any suitable furnace (e.g., an inductively or resistively heated furnace, a gas-fired furnace, or an electric arc furnace).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO_2$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150, or even 200 micrometers).

The quench rates achieved in making the glasses are believed to be higher than $10^3$, $10^4$, $10^5$ or even $10^{6\circ}$ C/sec (i.e., a temperature drop of 1000° C. from a molten state in less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one method, raw materials (which may include or be, for example glass (i.e., glass to be re-melted) and/or ceramic particles comprising glass) having the desired composition can be converted into a melt, which is in turn can be introduced into a mold, for example, using a flame forming process, wherein, in general, the appropriate metal oxide sources or glass having the desired composition are heated by flame to form a melt (flame fusion), desirably a homogenous melt. An exemplary flame fusion process is disclosed, for example, in U.S. Pat. No. 6,254,981 (Castle), the disclosure of which is incorporated herein by reference. In this method, the metal oxide sources are fed (e.g., in the form of particles, sometimes referred to as "feed particles") directly into a burner (e.g., a methane-air burner, an acetylene-oxygen burner, a hydrogen-oxygen burner, and like). After formation, the melt is introduced into the desired mold.

Other techniques for making glasses include laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et al., Metals And Ceramics Information Center, A Department of Defense Information Analysis Center, Columbus, Ohio, January, 1984, the disclosure of which is incorporated here as a reference). Some embodiments of glasses may also be obtained by other techniques, such as: thermal (including flame or laser or plasma-assisted) pyrolysis of suitable precursors, physical vapor synthesis (PVS) of metal precursors and mechanochemical processing.

Further, other techniques for making melts and glasses include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s). The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, co-pending application having U.S. Ser. No. 10/211,640, filed Aug. 2, 2002, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Container-less glass forming techniques utilizing laser beam heating as disclosed, for example, in U.S. Pat. No. 6,482,758 (Weber), the disclosure of which is incorporated herein by reference, may also be useful in making glass.

The addition of certain metal oxides may alter the properties and/or crystalline structure or microstructure of ceramics according to the present invention, as well as the processing of the raw materials and intermediates in making the ceramic. For example, oxide additions such as CaO, $Li_2O$, MgO, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease of glass-formation. Complex eutectics in multi-component systems (quaternary, etc.) may result in better glass-forming ability. The viscosity of the liquid melt and viscosity of the glass in its working range may also be affected by the addition of metal oxides other than the particular required oxide(s).

Crystallization of glasses (including glass present in a ceramic) to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may the change nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, $CeO_2$, CaO, and MgO) that are known to stabilize tetragonal/cubic form of $ZrO_2$.

The particular selection of metal oxide sources and other additives for making glass-ceramics according to the present invention typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be desirable to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides when used are typically are added from greater than 0 to 20% by weight collectively (in some embodiments, greater than 0 to 5% by weight collectively, or even greater than 0 to 2% by weight collectively) of the glass-ceramic depending, for example, upon the desired property.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles using an appropriate sized screen to collect the particles. The measurements are done in the following manner. A single layer of particles is spread out upon a glass slide. The particles are observed using an optical microscope. Using the crosshairs in the optical microscope eyepiece as a guide, particles that lay along a straight line are counted either amorphous or crystalline depending on their optical clarity. A total of 500 particles are typically counted, although fewer particles may be used and a percent amorphous yield is determined by the amount of amorphous particles divided by total particles counted. Embodiments of methods according to the have percent amorphous (or glass) yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffused intensity peak is taken as an indication of the amorphous nature of a material. The existence of both a broad peak and well-defined peaks is taken as an indication of existence of crystalline matter within a glass matrix.

Typically, the ceramic particles are made in accordance with a predetermined shaped and predetermined dimensions, and hence further size reduction is not needed. However, if size reduction is desired, such reduction can be obtained, for example, using crushing and/or comminuting techniques known in the art. Such particles can be converted into smaller pieces using crushing and/or comminuting techniques known in the art, including roll crushing, jaw crushing, hammer milling, ball milling, jet milling, impact crushing, and the like. In some instances, it is desired to have two or multiple crushing steps. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of ceramic particles comprising glass or particles comprising glass-ceramic can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments 1.25:1 to 3:1, or even 1.5:1 to 2.5:1.

Embodiments of glass particles made according to the present invention can be coalesced to provide articles without limitations in dimensions. This is possible through a coalescing step performed at temperatures above glass transition temperature. This coalescing step in essence forms a larger sized body from two or more smaller particles. For instance, as evident from FIG. 10, glass made according to the present invention undergoes glass transition ($T_g$) before significant crystallization occurs ($T_x$) as evidenced by the existence of an endotherm ($T_g$) at lower temperature than an exotherm ($T_x$). For example, glass particles are heated above the $T_g$ such that the glass particles coalesce to form a desired shape, the coalesced shape is then cooled. The temperature and pressure used for coalescing may depend, for example, upon composition of the glass and the desired density of the resulting material. The temperature should be greater than the glass transition temperature. In certain embodiments, the heating is conducted at at least one temperature in a range of about 850° C. to about 1100° C. (in some embodiments, 900° C. to 1000° C.). Typically, the glass is under pressure (e.g., greater than zero to 1 GPa or more) during coalescence to aid the coalescence of the glass. In one embodiment, a charge of the glass particles is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). Typically, it is generally desirable to cool the resulting coalesced body before further heat treatment. After heat treatment if so desired, the coalesced body may be crushed to smaller particle sizes or a desired particle size distribution.

Coalescing of the glass may also be accomplished by a variety of methods, including pressure-less or pressure sintering.

In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments even less than 5 seconds) to a few minutes to several hours. The temperature typically ranges from the $T_x$ of the amorphous material to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes leas to improved mechanical properties (e.g., higher strength and higher hardness). In particular, it is very desirable to form ceramics with densities of at least 90, 95, 97, 98, 99, or even at least 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of glasses according to this invention may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for example, it may be desirable to heat-treat under gas pressure as in, for example, hot-isostatic press, or in gas pressure furnace. Although not wanting to be bound by theory, it is believed that atmospheres may affect oxidation states of some of the components of the glasses and glass-ceramics. Such variation in oxidation state can bring about varying coloration of glasses and glass-ceramics. In addition, nucleation and crystallization steps can be affected by atmospheres (e.g., the atmosphere may affect the atomic mobilities of some species of the glasses).

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., $2^{nd}$ edition, 1979, the disclosure of which is incorporated herein by reference.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

For example, during heat-treatment of some exemplary glasses described herein, formation of phases such as $La_2Zr_2O_7$, and, if $ZrO_2$ is present, cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10-15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) digital micrograph of the microstructure found in the sample is used to determine the average crystallite size as follows. The number of crystallites that intersect per unit length ($N_L$) of a random straight line drawn across the digital micrograph are counted. The average crystallite size is determined from this number using the following equation.

$$\text{Average Crystallite Size} = \frac{1.5}{N_L M},$$

where $N_L$ is the number of crystallites intersected per unit length and M is the magnification of the digital micrograph.

In another aspect, glass-ceramics provided by the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer. In another aspect, glass-ceramics provided by the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.5 micrometer. In another aspect, glass-ceramics provided by the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.3 micrometer. In another aspect, glass-ceramics provided by the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.15 micrometer.

Examples of crystalline phases which may be present in glass-ceramics provided by the present invention include: alumina (e.g., alpha and transition aluminas), REO (e.g., $La_2O_3$), $Y_2O_3$, MgO, one or more other metal oxides such as BaO, CaO, $Cr_2O_3$, CoO, $Fe_2O_3$, $GeO_2$, $Li_2O$, MnO, NiO, $Na_2O$, $P_2O_5$, $Sc_2O_3$, $SiO_2$, SrO, $TeO_2$, $TiO_2$, $V_2O_3$, ZnO, $HfO_2$, $ZrO_2$ (e.g., cubic $ZrO_2$ and tetragonal $ZrO_2$), as well as "complex metal oxides" (including complex $Al_2O_3$.metal oxide (e.g., complex $Al_2O_3$.REO)), complex $Al_2O_3$.metal oxide(s) (e.g., complex $Al_2O_3$.REO (e.g., $ReAlO_3$ (e.g., $GdAlO_3$ $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3$.$Y_2O_3$ (e.g., $Y_3Al_5O_{12}$), and complex $ZrO_2$.REO (e.g., $La_2Zr_2O_7$)), and combinations thereof. Typically, ceramics according to the present invention are free of eutectic microstructure features.

It is also with in the scope of the present invention to substitute a portion of the aluminum cations in a complex $Al_2O_3$.metal oxide (e.g., complex $Al_2O_3$.REO and/or complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Crystals formed by heat-treating amorphous to provide embodiments of glass-ceramics according to the present invention may be, for example, acicular equiaxed, columnar, or flattened splat-like features.

Some exemplary glasses and glass-ceramics made by methods of the present invention, and melts used to make such glasses comprise at least 75 percent (in some embodiments, at least 80, 85, or even at least 90; in some embodiments, in a range from 75 to 90) by weight $Al_2O_3$, at least 0.1 percent (in some embodiments, at least 1, at least 5, at least 10, at least 15, at least 20, or 23.9; in some embodiments, in a range from 10 to 23.9, or 15 to 23.9) by weight $La_2O_3$, at least 1 percent (in some embodiments, at least 5, at least 10, at least 15, at least 20, or even 24.8; in some embodiments, in a range from 10 to 24.8, 15 to 24.8) by weight $Y_2O_3$, and at least 0.1 percent (in some embodiments, at least 1, at least 2, at least 3, at least 4, at least 5, at least 6, at least 7, or even 8; in some embodiments, in a range from 0.1 to 8 or 0.1 to 5, or 0.1 to 2) by weight MgO, based on the total weight of the glass, glass-ceramic, or melt, respectively.

Some exemplary glasses and glass-ceramics made by methods of the present invention, and melts used to make such glasses comprise at least 75 percent (in some embodiments, at least 80, 85, or even at least 90; in some embodiments, in a range from 75 to 90) by weight $Al_2O_3$, and at least 1 percent (in some embodiments, at least 5, at least 10, at least 15, at least 20, or even 25; in some embodiments, in a range from 10 to 25, 15 to 25) by weight $Y_2O_3$, based on the total weight of the glass, glass-ceramic, or melt, respectively.

Some exemplary glasses and glass-ceramics made by methods of the present invention, and melts used to make such glasses comprise at least 75 (in some embodiments, at least 80, 85, or even at least 90) percent by weight $Al_2O_3$, and at least 10 (in some embodiments, at least 15, 20 or even at least 25) percent by weight $Y_2O_3$ based on the total weight of the glass, glass-ceramic or melt, respectively.

Some exemplary glasses and glass-ceramics made by methods of the present invention, and melts used to make such glasses comprise at least 75 (in some embodiments at least 80, or even at least 85) percent by weight $Al_2O_3$, $La_2O_3$ in a range from 0 to 25 (in some embodiments, 0 to 10, or even 0 to 5) percent by weight, $Y_2O_3$ in a range from 5 to 25 (in some embodiments, 5 to 20, or even 10 to 20) percent by weight, MgO in a range from 0 to 8 (in some embodiments, 0 to 4, or even 0 to 2) percent by weight, based on the total weight of the glass, glass-ceramic, or melt, respectively.

Some exemplary glasses and glass-ceramics made by methods of the present invention, and melts used to make such glasses comprise at least 75 (in some embodiments at least 80, 85, or even at least 90) percent by weight $Al_2O_3$ and $SiO_2$ in an amount up to 10 (in some embodiments, in a range from 0.5 to 5, 0.5 to 2, or 0.5 to 1) percent by weight, based on the total weight of the glass, glass-ceramic, or melt, respectively.

For some embodiments of glasses and glass-ceramics made by methods of the present invention, and melts used to make such glasses, comprise $ZrO_2$ and/or $HfO_2$, the amount of $ZrO_2$ and/or $HfO_2$ present may be at least 5, 10, 15, or even at least 20 percent by weight, based on the total weight of the glass, glass-ceramic or melt, respectively.

Additional glass compositions which may be useful in the method according to the present invention include those disclosed in applications having U.S. Ser. Nos. 09/922,526, 09/922,527, 09/922,528, and 09/922,530, filed Aug. 2, 2001, now abandoned, Ser. Nos. 10/211,597, 10/211,638, 10/211,629, 10/211,598, 10/211,630, 10/211,639, 10/211,034, 10/211,044, 10/211,628, 10/211,491, 10/211,640, and 10/211,684, each filed Aug. 2, 2002, and Ser. Nos. 10/358,910, 10/358,708, 10/358,855, and 10/358,765, filed the same date as the instant application, the disclosures of which are incorporated herein by reference.

Certain glasses used in the methods according to the present invention may have, for example, a $T_g$ in a range of about 750° C. to about 950° C.

The average hardness of the glasses and glass-ceramics can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference. The average hardness is an average of 10 measurements.

Certain glasses used in the methods according to the present invention may have, for example, an average hardness of at least 5 GPa (more desirably, at least 6 GPa, 7 GPa, 8 GPa, or 9 GPa; typically in a range of about 5 GPa to about 10 GPa), and glass-ceramics made by the present invention at least 5 GPa (more desirably, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa (or more); typically in a range of about 5 GPa to about 18 GPa). Abrasive particles made by the present invention have an average hardness of at least 15 GPa, in some embodiments, at least 16 GPa, at least 17 GPa, or even at least 18 GPa.

Certain glasses used in the methods according to the present invention may have, for example, a thermal expansion coefficient in a range of about $5 \times 10^{-6}$/K to about $11 \times 10^{-6}$/K over a temperature range of at least 25° C. to about 900° C.

Typically, and desirably, the (true) density, sometimes referred to as specific gravity, of ceramics made by the present invention is typically at least 70% of theoretical density. More desirably, the (true) density of glasses and glass-ceramics made by the present invention is at least 75%, 80%, 85%, 90%, 95%, 96%, 97%, 98%, 99%, 99.5% or even 100% of theoretical density. Abrasive particles made according to the present invention have densities of at least 85%, 90%, 92%, 95%, 96%, 97%, 98%, 99%, 99.5% or even 100% of theoretical density.

Articles can be made using particles comprising glass and glass-ceramic made by the present invention as a filler or reinforcement material. For example, the particles can be used as filler or reinforcing materials in composites (e.g., ceramic, metal, or polymeric (thermosetting or thermoplastic)). Although the size, shape, and amount of the particles used to make a composite may depend, for example, on the particular matrix material and use of the composite, the size of the particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., glass and glass-ceramic particles made according to a method of the present invention dispersed in a polymer) include protective coatings, for example, for concrete, furniture, floors, roadways, wood, wood-like materials, ceramics, and the like, as well as, anti-skid coatings and injection molded plastic parts and components.

Abrasive particles made according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles according to the present invention. In another aspect, embodiments of abrasive particles according to the present invention generally comprise (e.g., at least 75, 80, 85, 90, 91, 92, 93, 94, 95, 96, 97, 98, 99, 99.5, or even 100 percent by volume) glass-ceramic.

The abrasive particles can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). However, since the ceramic particles as made may already have a narrow particle size distribution (e.g., essentially all of the particles may have the same size), graded by not be necessary to obtained the desired distribution of particles. It is also within the scope of the present, invention to make a variety of sizes and/or shapes of ceramic particles (e.g., the mold openings or cavity for a given mold or cavity may have a variety of opening or cavities and/or shapes), which may provide a wider distribution of particle size.

The abrasive particles may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

In a given particle size distribution, there will be a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS 100, JIS 150, JIS 180, JIS220, JIS240, JIS280, JIS320, JIS360, JIS400, JIS600, JIS800, JIS 1000, JIS 1500, JIS2500, JIS4000, JIS6000, JIS8000, and JIS 10,000.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution.

In another aspect, the present invention provides agglomerate abrasive grains each comprising a plurality of abrasive particles made according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made according to the present invention. Methods of making such abrasive articles and using abrasive articles are well known to those skilled in the art. Furthermore, abrasive particles made according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

Figure 1:
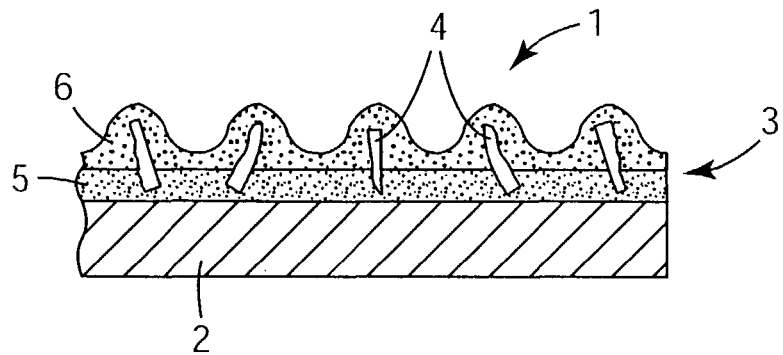
FIG. 1 is a fragmentary cross-sectional schematic view of a coated abrasive article including abrasive particles made according to the present invention.

An example of a coated abrasive article is depicted in FIG. 1. Referring to FIG. 1, coated abrasive article 1 has a backing (substrate) 2 and abrasive layer 3. Abrasive layer 3 includes abrasive particles made according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3-50% by volume bond material, about 30-90% by volume abrasive particles (or abrasive particle blends), up to 50% by volume additives (including grinding aids), and up to 70% by volume pores, based on the total volume of the bonded abrasive article.

Figure 2:
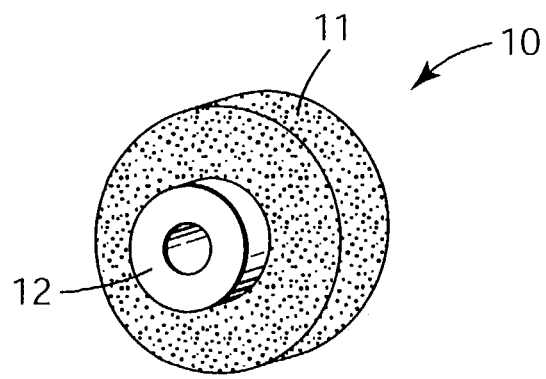
FIG. 2 is a perspective view of a bonded abrasive article including abrasive particles made according to the present invention.

An exemplary grinding wheel is shown in FIG. 2. Referring to FIG. 2, grinding wheel 10 is depicted, which includes abrasive particles made according to the present invention 11, molded in a wheel and mounted on hub 12.

Figure 3:
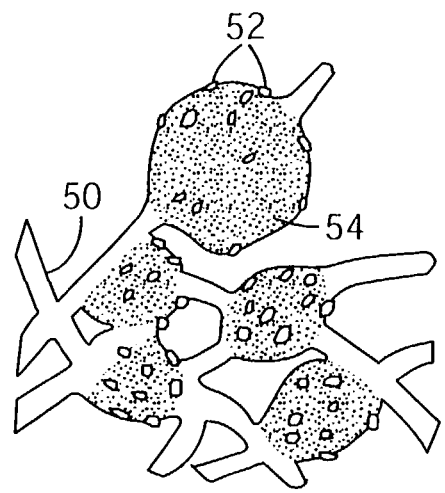
FIG. 3 is an enlarged schematic view of a nonwoven abrasive article including abrasive particles made according to the present invention.

Nonwoven abrasive articles typically include an open porous lofty polymer filament structure having abrasive particles made according to the present invention distributed throughout the structure and adherently bonded therein by an organic binder. Examples of filaments include polyester fibers, polyamide fibers, and polyaramid fibers. An exemplary nonwoven abrasive article is shown in FIG. 3. Referring to FIG. 3, a schematic depiction, enlarged about 100×, of a typical nonwoven abrasive article is shown, comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427, 595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751, 138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles made according to the present invention may be in the shape of a wheel (including cut off wheels), honing stone, mounted pointed or other conventional bonded abrasive shape. In some embodiments, a vitrified bonded abrasive article made according to the present invention is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50-300 $g/m^2$ (desirably, about 80-160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30-100% by weight, of the abrasive particles in the abrasive articles should be abrasive particles made according to the present invention. In some instances, the abrasive particles made according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498, 269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268, 533 (Allen), and U.S. Pat. No. 2,424,645 (Baumann et al.), U.S. Pat. No. 3,891,408 (Rowse et al.), U.S. Pat. No. 3,781, 172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.), and applications having U.S. Ser. Nos. 09/495,978, 09/496,422, 09/496,638, and 09/496,713, each filed on Feb. 2, 2000, and,Ser. Nos. 09/618,876, 09/618,879, 09/619,106, 09/619,191, 09/619,192, 09/619,215, 09/619, 289, 09/619,563, 09/619,729, 09/619,744, and 09/620,262, each filed on Jul. 19, 2000, Ser. No. 09/704,843, filed Nov. 2, 2000, and Ser. No. 09/772,730, filed Jan. 30, 2001, the disclosures of which are incorporated herein by reference. Additional details regarding ceramic abrasive particles, can be found, for example, in applications having U.S. Ser. Nos. 09/922,526, 09/922,527, 09/922,528, and 09/922,530, filed Aug. 2, 2001, now abandoned, Ser. Nos. 10/211,597, 10/211, 638, 10/211,629, 10/211,598, 10/211,630, 10/211,639, 10/211,034, 10/211,044, 10/211,628, 10/211,491, 10/211, 640, and 10/211,684, each filed Aug. 2, 2002, and Ser. Nos. 10/358,910, 10/358,708, 10/358,855, 10/358,765, filed the same date as the instant application, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made according to the present invention, with the smaller sized particles being another abrasive particle type. Conversely, for example, the smaller sized abrasive particles may be abrasive particles made according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, Ser. Nos. 09/688,444, 09/688,484, 09/688,486, filed Oct. 16, 2000, and Ser. Nos. 09/971,899, 09/972,315, and 09/972,316, filed Oct. 5, 2001, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made according to the present invention, and the second (outermost) layer comprises abrasive particles made according to the present invention. Likewise in a bonded abrasive, there may be two distinct sections of the grinding wheel. The outermost section may comprise abrasive particles made according to the present invention, whereas the innermost section does not. Alternatively, abrasive particles made according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson), the disclosures of which are incorporated herein by reference.

Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle made according to the present invention, with a surface of a workpiece; and moving at least of one the abrasive particles or the contacted surface to abrade at least a portion of said surface with the abrasive particle. Methods for abrading with abrasive particles made according to the present invention range of snagging (i.e., high pressure high stock removal) to polishing (e.g., polishing medical implants with coated abrasive belts), wherein the latter is typically done with finer grades (e.g., ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made according to the present invention may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLE 1

A 250-milliliter alumina ball-mill (7.3-cm diameter) was charged with a 50-gram mixture of powders (19.25 grams of aluminum oxide powder (obtained from Alcoa Industrial Chemicals, Bauxite, Ark., under the trade designation "Al6SG"), 21.25 grams of lanthanum oxide powder (obtained from Molycorp Inc., Mountain Pass, Calif. and calcined at 700° C. for 6 hours prior to batch mixing), and 9.5 grams of zirconia powder (obtained from Zirconia Sales, Inc. of Marietta, Ga. under the trade designation "DK-2")), 75 grams of isopropyl alcohol, and 200 grams of alumina milling media (cylindrical in shape, both height and diameter of 0.635 cm; 99.9% alumina; obtained from Coors, Golden Colo.). The contents of the polyethylene bottle were milled for 16 hours at 60 revolutions per minute (rpm). After the milling, the milling media were removed and the slurry was poured onto a warm (about 75° C.) glass ("PYREX") pan and allowed to dry and cool. The dried mixture (cake) was ground by screening it through a 20-mesh screen (850-micrometer opening size) with the aid of a paintbrush. The resulting screened granulated powder was heated at 1400° C. in air for 30 minutes to remove volatiles and agglomerate the powder.

The agglomerated powder was charged into a graphite crucible (a cavity, 1.35 cm inner diameter and 12.7 cm deep, machined at the end of about 60 cm long, and 1.587 cm diameter graphite rod), which was then inserted into a graphite tube furnace. The tube furnace was tilted about 30 degrees to the horizontal. The furnace was heated to 2000° C. The atmosphere in the tube was flowing argon gas rate. The contents of the crucibles were held in the hot zone of the furnace for 5 minutes while rotating the graphite rod continuously to form a uniform melt. At the end of melting the graphite rod (i.e., the crucible) was pulled out of the furnace and its content were poured on to a twin set of steel rollers (45 cm long and 5.25 cm in diameter) rotating in opposing directions at about 40 rpms. A perforated continuous loop of steel mold plate (a steel screen, 0.3 mm thick, 20 cm wide and 90 cm long, containing a multitude of small equilateral triangular cavities with a base width of 2 mm). The openings were separated from each other 2 mm and arranged in a linear fashion with respect to each other was sandwiched between the two rollers, as generally shown in FIGS. 4 and 4a. The continuous loop of steel screen was rotated continuously by the rotation of the twin rollers. The melt which filled in the triangular cavities of the mold solidified, resulting in shaped equilateral triangles having base widths of just less than about 2 mm.

The phase composition (glassy/amorphous/crystalline) of the resulting shaped equilateral triangular particles was determined through Differential Thermal Analysis (DTA). The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted on the shaped equilateral triangular particles of Example 1 using the following method. A DTA run was made (using an instrument obtained from Netzsch Instruments, Selb, Germany under the trade designation "NETZSCH STA 409 DTA/TGA"). A portion of the shaped particles were crushed using a hammer and was screened to recover −140+170 mesh size fraction (i.e., the fraction collected between 105-micrometer opening size and 90-micrometer opening size screens). An amount of the screened sample (~350 micrograms) was placed in a 100-microliter $Al_2O_3$ sample holder. The sample was heated in static air at a rate of 10° C./minute from room temperature (about 25° C.) to 1100° C.

Figure 10:
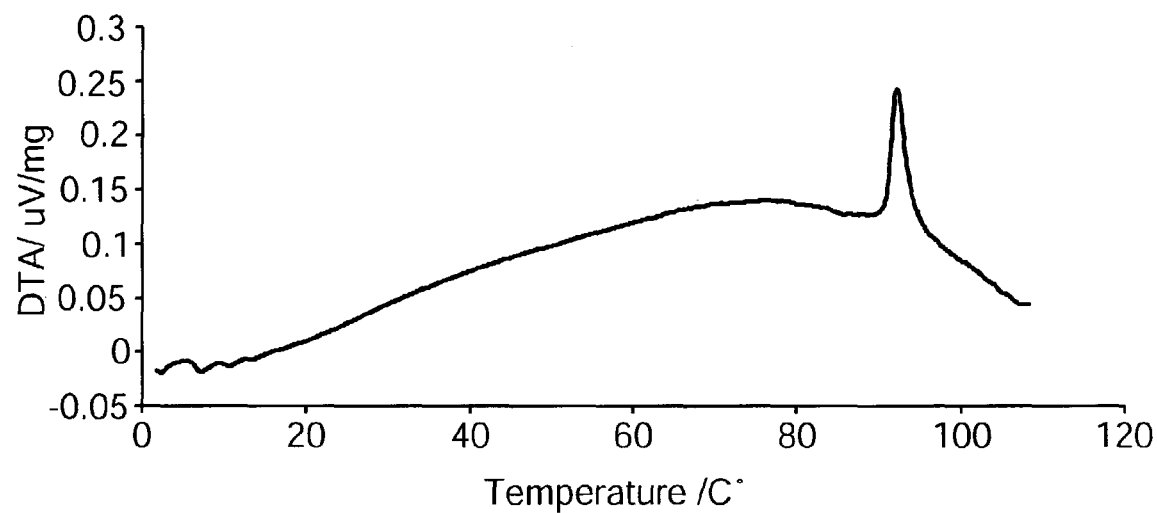
FIG. 10 is a DTA of the material prepared in Example 1.

The DTA trace of the sample, shown in FIG. 10, exhibited an endothermic event at a temperature about 854° C., as evidenced by a downward change in the curve of the trace. It is believed this event was due to the glass transition ($T_g$) of the glass material. The same material exhibited an exothermic event at a temperature about 932° C., as evidenced by a sharp peak in the trace. It is believed that this event was due to the crystallization ($T_x$) of the material. Hence, the material was determined to be glassy.

The glassy shaped grits were crystallized by heat-treating them at 1300° C. for 1 hour in an electrically heated furnace. The resulting heat-treated particles were opaque as observed using an optical microscope (prior to heat-treatment, the particles were transparent). The opacity of the heat-treated particles is believed to be a result of the crystallization of the particles. Amorphous materials (including glassy materials) are typically predominantly transparent due to the lack of light scattering centers such as crystal boundaries, while the crystalline particles are opaque due to light scattering effects of the crystal boundaries.

Powder x-ray diffraction, XRD, (using an x-ray diffractometer (obtained under the trade designation "PHILLIPS XRG 3100" from Phillips, Mahwah, N.J.) with copper K α1 radiation of 1.54050 Angstrom) was used to determine the phases present in the crystallized particles. The phases were determined by comparing the peaks present in the XRD trace of the crystallized material to XRD patterns of crystalline phases provided in JCPDS (Joint Committee on Powder Diffraction Standards) databases, published by International Center for Diffraction Data. The resulting crystalline material included $LaAlO_3$, $ZrO_2$ (cubic, tetragonal), $LaAl_{11}O_{18}$, and transitional $Al_2O_3$ phases.

The average crystallite size was be determined by the line intercept method according to the ASTM standard E 112-96 "Standard Test Methods for Determining Average Grain Size". The sample is mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (Model JSM 840A from JEOL, Peabody, Mass.). A typical back-scattered electron (BSE) digital micrograph of the microstructure found in the sample is used to determine the average crystallite size as follows. The number of crystallites that intersect per unit length ($N_L$) of a random straight line drawn across the digital micrograph are counted. The average crystallite size was determined from this number using the following equation.

$$\text{Average Crystallite Size} = \frac{1.5}{N_L M},$$

where $N_L$ is the number of crystallite intersected per unit length and M is the magnification of the digital micrograph.

The average hardness of the heat-treated material was determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

The average hardness of the heat-treated Example 1 material, based on an average of 10 measurements, was found to be 17.5 GPa.

EXAMPLE 2

Example 2 was prepared as described above for Example 1, except the screen positioned between the rollers was 30 cm wide, 90 cm long, and 0.5 mm thick, and the base width of the equilateral triangles was 3 mm. The triangular openings on the mold were 2 mm apart from each other, and were arranged linearly with respect to each other. The resulting shaped equilateral triangular particles had base widths just less than about 3 mm.

The phase composition (glassy/amorphous/crystalline) was determined through Differential Thermal Analysis (DTA) as described above for Example 1. The DTA trace of the shaped equilateral triangular particles exhibited an endothermic event at a temperature about 856° C., as evidenced by a downward change in the curve of the trace. It is believed this event was due to the glass transition ($T_g$) of the glass material. The same material exhibited an exothermic event at a temperature about 933° C., as evidenced by a sharp peak in the trace. It is believed that this event was due to the crystallization ($T_x$) of the material. Hence, the material was determined to be glassy.

The shaped equilateral triangular particles were crystallized by heat-treating them at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of the particles.

EXAMPLE 3

Example 3 was prepared as described above for Example 1, except the screen positioned between the rollers was 30 cm wide, 90 cm long, and 0.6 mm thick, and the shape was squares having widths of 2 mm. The squared openings on the mold were 1.5 mm apart from each other, and were arranged linearly with respect to each other. The resulting square particles had widths just less than about 2 mm.

The phase composition (glassy/amorphous/crystalline) was determined through Differential Thermal Analysis (DTA) as described above for Example 1. The DTA trace of the square particles exhibited an endothermic event at a temperature about 855° C., as evidenced by a downward change in the curve of the trace. It is believed this event was due to the glass transition ($T_g$) of the glass material. The same material exhibited an exothermic event at a temperature about 935° C., as evidenced by a sharp peak in the trace. It is believed that this event was due to the crystallization ($T_x$) of the material. Hence, the material was determined to be glassy.

The square particles were crystallized by heat-treating them at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of the at least apportion of the glass.

EXAMPLE 4

Example 4 was prepared as described above for Example 1, except the screen between the rollers was 20 cm wide, 90 cm long, and 0.6 mm thick, and the shape was circles with diameters of 2 mm. The circular openings on the mold were 2 mm apart from each other, and were arranged linearly with respect to each other. The resulting shaped circular particles had a diameter just less than about 2 mm.

The phase composition (glassy/amorphous/crystalline) was determined through Differential Thermal Analysis (DTA) as described above for Example 1. The DTA trace of the circular particles exhibited an endothermic event at a temperature about 855° C., as evidenced by a downward change in the curve of the trace. It is believed this event was due to the glass transition ($T_g$) of the glass material. The same material exhibited an exothermic event at a temperature about 933° C., as evidenced by a sharp peak in the trace. It is believed that this event was due to the crystallization ($T_x$) of the material. Hence, the material was determined to be glassy.

These circular particles were crystallized by heat-treating them at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of the at least apportion of the glass.

EXAMPLE 5

Example 5 was prepared as described above for Example 1, except the raw materials used for the 50-gram mixture of powders were 20.5 grams of aluminum oxide powder (obtained from Alcoa Industrial Chemicals, Bauxite, Ark., under the trade designation "Al6SG"), 20.5 grams gadolinium oxide powder (obtained from Molycorp Inc., Mountain Pass, Calif.), and 9.0 grams of zirconia powder (Obtained from Zirconia Sales, Inc. of Marietta, Ga. under the trade designation "DK-2"), and the screen positioned between the rollers was 20 cm wide, 90 cm long, 0.6 mm thick, and the shape was squares having widths of 2 mm. The squared openings on the mold were 1.5 mm apart from each other, and were arranged linearly with respect to each other. The resulting square particles had widths just less than about 2 mm.

The phase composition (glassy/amorphous/crystalline) was determined through Differential Thermal Analysis (DTA) as described above for Example 1. The DTA trace of the square particles exhibited an endothermic event at a temperature about 895° C., as evidenced by a downward change in the curve of the trace. It is believed this event was due to the glass transition ($T_g$) of the glass material. The same material exhibited an exothermic event at a temperature about 930° C., as evidenced by a sharp peak in the trace. It is believed that this event was due to the crystallization ($T_x$) of the material. Hence, the material was determined to be glassy.

These square particles were crystallized by heat-treating them at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of at least apportion of the glass.

Microstructural analysis of this sample by SEM, as described in Example 1 (using the BSE images), did not show any crystals coarser than 200 nm.

EXAMPLE 6

Example 6 was prepared as described above for Example 1, except the raw materials used for the 50-gram mixture of powders were 27.9 grams of aluminum oxide powder (obtained from Alcoa Industrial Chemicals, Bauxite, Ark., under the trade designation "Al6SG"), 14.3 grams yttrium oxide powder (obtained from H. C. Stark Newton, Mass.), and 7.8 grams of zirconia powder (obtained from Zirconia Sales, Inc. of Marietta, Ga. under the trade designation "DK-2"), and the screen positioned between the rollers was 20 cm wide, 90 cm long, and 0.6 mm thick, and the shape was squares having widths of 2 mm. The squared openings on the mold were 1.5 mm apart from each other, and were arranged linearly with respect to each other. The resulting square particles had widths just less than about 2 mm.

The phase composition (glassy/amorphous/crystalline) was determined through Differential Thermal Analysis (DTA) as described for Example 1. The DTA trace of the square particles exhibited an endothermic event at a temperature about 906° C., as evidenced by a downward change in the curve of the trace. It is believed this event was due to the glass transition ($T_g$) of the glass material. The same material exhibited an exothermic event at a temperature about 934° C., as evidenced by a sharp peak in the trace. It is believed that this event was due to the crystallization ($T_x$) of the material. Hence, the material was determined to be glassy.

The square particles were crystallized by heat-treating at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of at least apportion of the glass.

EXAMPLE 7

Figure 11:
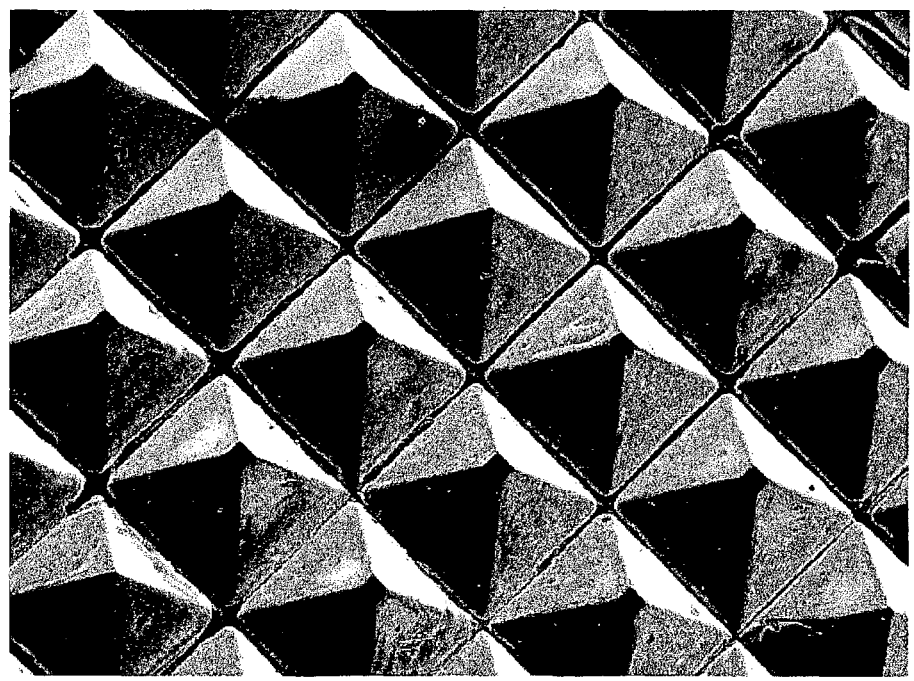
FIG. 11 is a scanning electron microscope digital micrograph of Example 7 material.

Example 7 was prepared as described above for Example 1, except the mold was a 25 cm wide, 50 cm long nickel-base sheet engraved with cavities having pyramidal cavities (square bases, 1 mm by 1 mm, and height of 0.5 mm). FIG. 11 is a scanning electron microscope (SEM) digital micrograph of the resulting sheet of pyramidal shapes.

The resulting sheets of solidified material were lightly crushed. The sheets fractured off along the sides of the bases of pyramids resulting in pyramidal shaped particles having squared bases with, about 1 mm sides, and heights of about 0.5 mm.

The phase composition (glassy/amorphous/crystalline) of the pyramidal shaped particles was determined through Differential Thermal Analysis (DTA) as described above for Example 1. The DTA trace of the pyramidal shaped particles exhibited an endothermic event at a temperature about 854° C., as evidenced by a downward change in the curve of the trace. It is believed this event was due to the glass transition ($T_g$) of the glass material. The same material exhibited an exothermic event at a temperature about 933° C., as evidenced by a sharp peak in the trace. It is believed that this event was due to the crystallization ($T_x$) of the material. Hence, the material was determined to be glassy.

These pyramidal shaped particles were crystallized by heat-treating them at 1300° C. for 1 hour in an electrically heated furnace. The heat-treated particles were opaque as observed using an optical microscope (prior to heat-treatment, the particles were transparent). The opacity of the heat-treated particles is believed to be a result of the crystallization of at least apportion of the glass.

The average hardness of the heat-treated material was determined as described above for Example 1, and found to each be 17.5 GPa.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making ceramic particles, the method comprising:
   providing first and second generally opposed surfaces;
   providing a mold comprising a plurality of at least one of particle openings or cavities;
   introducing a melt to at least a portion of the plurality of at least one of the particle openings or cavities of the mold, the melt comprising at least 35 percent by weight $Al_2O_3$, based on the total weight of the melt, and a first metal oxide other than $Al_2O_3$ wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt;
   passing the mold and the melt between the first and second generally opposed surface under pressure such that the melt in the at least one of the particle openings or cavities is under pressure; and
   at least partially cooling the melt in the at least one of the particle openings or cavities to provide ceramic particles comprising glass, the glass comprising at least 35 percent by weight $Al_2O_3$, based on the total weight of the glass, and a first metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

2. The method according to claim 1, wherein the first and second generally opposed surfaces are exterior surfaces of first and second rollers.

3. The method according to claim 2, wherein the mold is an endless sheet.

4. The method according to claim 3, wherein the mold rotates about an axis.

5. The method according to claim 2, wherein the at least one of the particle openings or cavities have at least one shape selected from the group consisting of triangles, squares, rectangles, cubes, circles, cylinders, half-cylinders, stars, crescents, semi-circles, and pyramids.

6. The method according to claim 2, further comprising heat-treating the ceramic particles to convert at least a portion of the glass to glass-ceramic particles.

7. The method according to claim 6, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

8. The method according to claim 7, wherein the melt further comprises third, different metal oxide other than $Al_2O_3$ and the first metal oxide, and wherein the glass further comprises third, different metal oxide other than $Al_2O_3$ and the first metal oxide.

9. The method according to claim 2, further comprising heat-treating the glass particles to convert at least a portion of the glass to glass-ceramic abrasive particles.

10. The method according to claim 9, wherein the glass-ceramic abrasive particles have an average hardness of at least 17 GPa.

11. The method according to claim 9, wherein the glass-ceramic abrasive particles have an average hardness of at least 18 GPa.

12. The method according to claim 9, wherein the glass-ceramic abrasive particles have an average hardness of at least 19 GPa.

13. The method according to claim 9, wherein the glass-ceramic abrasive particles have an average hardness of at least 20 GPa.

14. The method according to claim 9, wherein at least a portion of the heating is conducted using a rotary kiln.

15. The method according to claim 9, further comprises grading the glass-ceramic abrasive particles to provide a plurality of particles having a specified nominal grade.

16. The method according to claim 9, further comprises grading the glass particles to be heat-treated to provide a plurality of particles having a specified nominal grade.

17. The method according to claim 9, further comprising incorporating at least a portion of the glass-ceramic abrasive particles into an abrasive article.

18. The method according to claim 17, wherein the abrasive article is a bonded abrasive article, a non-woven abrasive article, or a coated abrasive article.

19. The method according to claim 9, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

20. The method according to claim 19, wherein the melt further comprises third, different metal oxide other than $Al_2O_3$ and the first metal oxide, and wherein the glass further comprises third, different metal oxide other than $Al_2O_3$ and the first metal oxide.

21. The method according to claim 1, wherein the mold is an endless sheet.

22. The method according to claim 21, wherein the mold rotates about an axis.

23. The method according to claim 1, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

24. The method according to claim 23, wherein the melt further comprises third, different metal oxide other than $Al_2O_3$ and the first metal oxide, and wherein the glass further comprises third, different metal oxide other than $Al_2O_3$ and the first metal oxide.

25. A method for making ceramic particles, the method comprising:
providing a roll comprising a plurality of particle cavities;
introducing a melt to at least a portion of the plurality of particle cavities, the melt comprising at least 35 percent by weight $Al_2O_3$, based on the total weight of the melt, and a first metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and
at least partially cooling the melt in the particle cavities to provide ceramic particles comprising glass, the glass comprising at least 35 percent by weight $Al_2O_3$, based on the total weight of the glass, and a first metal oxide other than $Al_2O_3$, wherein the glass contains not more than 10 percent by weight collectively $As_2O_3$, $B_2O_3$, $GeO_2$, $P_2O_5$, $SiO_2$, $TcO_2$, and $V_2O_5$, based on the total weight of the glass; and
contacting a surface to the melt in the cavities such that the melt in the cavities is under pressure.

26. The method according to claim 25, wherein the particle cavities have at least one shape selected from the group consisting of triangles, squares, rectangles, cubes, circles, cylinders, half-cylinders, stars, crescents, semi-circles, and pyramids.

27. The method according to claim 25, further comprising heat-treating the glass particles to convert at least a portion of the glass to glass-ceramic particles.

28. The method according to claim 27, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

29. The method according to claim 28, wherein the melt further comprises third, different metal oxide other than $Al_2O_3$ and the first metal oxide, and wherein the glass further comprises third, different metal oxide other than $Al_2O_3$ and the first metal oxide.

30. The method according to claim 25, further comprising heat-treating the glass particles to convert at least a portion of the glass to glass-ceramic abrasive particles.

31. The method according to claim 30, wherein the glass-ceramic abrasive particles have an average hardness of at least 17 GPa.

32. The method according to claim 30, wherein the glass-ceramic abrasive particles have an average hardness of at least 18 GPa.

33. The method according to claim 30, wherein the glass-ceramic abrasive particles have an average hardness of at least 19 GPa.

34. The method according to claim 30, wherein the glass-ceramic abrasive particles have an average hardness of at least 20 GPa.

35. The method according to claim 30, wherein at least a portion of the heating is conducted using rotary kiln.

36. The method according to claim 30, further comprises grading the glass-ceramic abrasive particles to provide a plurality of particles having a specified nominal grade.

37. The method according to claim 30, further comprises grading the glass particles to be heat-treated to provide a plurality of particles having a specified nominal grade.

38. The method according to claim 30, further comprising incorporating at least a portion of the glass-ceramic abrasive particles into an abrasive article.

39. The method according to claim 38, wherein the abrasive article is a bonded abrasive article, a non-woven abrasive article, or a coated abrasive article.

40. The method according to claim 30, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TcO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

41. The method according to claim 40, wherein the melt further comprises third, different metal oxide other than $Al_2O_3$ and the first metal oxide, and wherein the glass further comprises third, different metal oxide other than $Al_2O_3$ and the first metal oxide.

42. A method for making ceramic particles, the method comprising:
providing first and second generally opposed surfaces;
providing a mold comprising a plurality of at least one of particle openings or cavities;
introducing a melt to at least a portion of the plurality of at least one of the particle openings or cavities of the mold,
passing the mold and the melt between the first and second generally opposed surface under pressure such that the melt in the at least one of particle the openings or cavities is under pressure;
at least partially cooling the melt in the at least one of the particle openings or cavities to provide ceramic particles comprising glass; and
heat-treating the ceramic particles to convert at least a portion of the glass to glass-ceramic particles, wherein the glass-ceramic has an average hardness of at least 13 GPa.

43. The method according to claim 42, wherein the first and second generally opposed surfaces are exterior surfaces of first and second rollers.

44. The method according to claim 42, wherein the glass-ceramic has an average hardness of at least 15 GPa.

45. The method according to claim 44, wherein the at least one of particle openings or cavities have at least one shape selected from the group consisting of triangles, squares, rectangles, cubes, circles, cylinders, half-cylinders, stars, crescents, semi-circles, and pyramids.

46. The method according to claim 44, further comprises grading the glass-ceramic particles to provide a plurality of particles having a specified nominal grade.

47. The method according to claim 44, further comprises grading the glass particles to be heat-treated to provide a plurality of particles having a specified nominal grade.

48. The method according to claim 44, further comprising incorporating at least a portion of the glass-ceramic particles into an abrasive article.

49. The method according to claim 48, wherein the abrasive article is a bonded abrasive article, a non-woven abrasive article, or a coated abrasive article.

50. The method according to claim 42, wherein the glass-ceramic has an average hardness of at least 17 GPa.

51. The method according to claim 50, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

52. The method according to claim 51, wherein the melt further comprises third, different metal oxide other than $Al_2O_3$ and the first metal oxide, and wherein the glass further comprises third, different metal oxide other than $Al_2O_3$ and the first metal oxide.

53. The method according to claim 42, wherein the glass-ceramic has an average hardness of at least 18 GPa.

54. The method according to claim 42, wherein the glass-ceramic has an average hardness of at least 19 GPa.

55. The method according to claim 42, wherein the glass-ceramic has an average hardness of at least 20 GPa.

56. A method for making ceramic particles, the method comprising:
providing a roll comprising a plurality of particle cavities;
introducing a melt to at least a portion of the plurality of particle cavities;
at least partially cooling the melt in the particle cavities to provide ceramic particles comprising glass; and
heat-treating the ceramic particles to convert at least a portion of the glass to glass-ceramic particles, wherein the glass-ceramic has an average hardness of at least 13 GPa.

57. The method according to claim 56 further comprising contacting a surface to the melt in the cavities such that the melt in the cavities is under pressure.

58. The method according to claim 56, wherein the glass-ceramic has an average hardness of at least 15 GPa.

59. The method according to claim 56, wherein the particle cavities have at least one shape selected from the group consisting of triangles, squares, rectangles, cubes, circles, cylinders, half-cylinders, stars, crescents, semi-circles, and pyramids.

60. The method according to claim 56, further comprises grading the glass-ceramic particles to provide a plurality of particles having a specified nominal grade.

61. The method according to claim 56, further comprises grading the glass particles to be heat-treated to provide a plurality of particles having a specified nominal grade.

62. The method according to claim 56, further comprising incorporating at least a portion of the glass-ceramic particles into an abrasive article.

63. The method according to claim 62, wherein the abrasive article is a bonded abrasive article, a non-woven abrasive article, or a coated abrasive article.

64. The method according to claim 56, wherein the glass-ceramic has an average hardness of at least 17 GPa.

65. The method according to claim 64, wherein the melt comprises at least 35 percent by weight $Al_2O_3$, based on the total weight of the melt, a first metal oxide other than $Al_2O_3$, and a second, different metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and wherein the glass comprises at least 35 percent by weight $Al_2O_3$, based on the total weight of the glass, a first metal oxide other than $Al_2O_3$, and a second, different metal oxide other than $Al_2O_3$, wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

66. The method according to claim 65, wherein the melt further comprises third, different metal oxide other than $Al_2O_3$ and the first metal oxide, and wherein the glass further comprises third, different metal oxide other than $Al_2O_3$ and the first metal oxide.

67. The method according to claim 56, wherein the glass-ceramic has an average hardness of at least 18 GPa.

68. The method according to claim 56, wherein the glass-ceramic has an average hardness of at least 19 GPa.

69. The method according to claim 56, wherein the glass-ceramic has an average hardness of at least 20 GPa.

70. A method for making ceramic particles, the method comprising:
  providing a roll comprising a plurality of particle openings, wherein the roller has an inner major surface and an outer major surface, and wherein the particle openings extend between the outer major surface and the inner major surface;
  introducing a melt to at least a portion of the plurality of particle openings, the melt comprising at least 35 percent by weight $Al_2O_3$, based on the total weight of the melt, and a first metal oxide other than $Al_2O_3$, wherein the melt contains not more than 10 percent by weight collectively $As_2O_3$, $B_2O_3$, $GeO_2$, $P_2O_5$, $SiO_2$, $TeO_2$, and $V_2O_5$, based on the total weight of the melt; and
  at least partially cooling the melt in the particle openings to provide ceramic particles comprising glass, the glass comprising at least 35 percent by weight $Al_2O_3$, based on the total weight of the glass, and a first metal oxide other than $Al_2O_3$ wherein the glass contains not more than 10 percent by weight collectively $As_2O_3$, $B_2O_3$, $GeO_2$, $P_2O_5$, $SiO_2$, $TeO_2$, and $V_2O_5$, based on the total weight of the glass.

71. The method according to claim 70, wherein the melt is introduced into the particle openings from the outer major surface of the roller such that the melt flows toward the inner major surface of the roller.

72. A method for making ceramic particles, the method comprising:
  providing a roll comprising a plurality of particle openings, wherein the roller has an inner major surface and an outer major surface, and wherein the particle openings extend between the outer major surface to the inner major surface;
  introducing a melt to at least a portion of the plurality of particle openings;
  at least partially cooling the melt in the particle openings to provide ceramic particles comprising glass; and
  heat-treating the ceramic particles to convert at least a portion of the glass to glass-ceramic particles, wherein the glass-ceramic has an average hardness of at least 13 GPa.

73. The method according to claim 72, wherein the melt is introduced into the particles openings from the outer major surface of the roller such that the melt flows toward the inner major surface of the roller.

* * * * *

UNITED STATES PATENT AND TRADEMARK OFFICE
CERTIFICATE OF CORRECTION

PATENT NO. : 7,811,496 B2
APPLICATION NO. : 10/358772
DATED : October 12, 2010
INVENTOR(S) : Ahmet Celikkaya et al.

Page 1 of 2

It is certified that error appears in the above-identified patent and that said Letters Patent is hereby corrected as shown below:

Title Page 4 Col. 1 (Other Publications) – Line 3 - Delete "Jarayam," and insert -- Jayaram, --, therefor.

Title Page 5 Col. 2 (Other Publications) – Line 64 - Delete ""Non-stoiciometry" and insert -- "Non-stoichiometry --, therefor.

Title Page 6 Col. 2 (Other Publications) – Line 22 - Delete ""Alunmina-Zirconia," and insert -- "Alumina-Zirconia, --, therefor.

Column 3 – Line 45 - Delete "malt," and insert -- melt, --, therefor.

Column 9 – Line 45 - Delete "fiicilitate" and insert -- facilitate --, therefor.

Column 9 – Line 48 - Delete "huffier" and insert -- further --, therefor.

Column 9 – Line 63 - Delete "of" and insert -- off --, therefor.

Column 9 – Line 67 - Delete "92," and insert -- 92. --, therefor.

Column 10 – Line 7 - Delete "fir" and insert -- for --, therefor.

Column 11 – Line 37 - Delete "cylindirical," and insert -- cylindrical --, therefor.

Column 11 – Line 37 - Delete "half-cylindiricalers," and insert -- half-cylindrical --, therefor.

Column 13 – Line 8 - Delete "spherodization)" and insert -- spheriodization) --, therefor.

Column 13 – Line 18 - Delete "spherodizing" and insert -- spheriodizing --, therefor.

Signed and Sealed this
Twenty-ninth Day of March, 2011

David J. Kappos
*Director of the United States Patent and Trademark Office*

CERTIFICATE OF CORRECTION (continued)
U.S. Pat. No. 7,811,496 B2

Column 18 – Line 50 - After "at" delete "at". (Second Occurrence)

Column 27 – Line 52 - Delete "tetrachloronaphtalene," and insert -- tetrachloronapthalene, --, therefor.

Column 27 – Line 55 - Delete "tetrafluoroboate," and insert -- tetrafluoroborate, --, therefor.

Column 38 – Line 28 - In Claim 25, delete "$TcO_2$," and insert -- $TeO_2$, --, therefor.

Column 39 – Line 26 - In Claim 40, delete "$TcO_2$," and insert -- $TeO_2$, --, therefor.

Column 39 – Line 49 - Delete "one of particles the openings" and insert -- one of particle openings --, therefor.